(12) United States Patent
Hirose et al.

(10) Patent No.: US 9,292,090 B2
(45) Date of Patent: Mar. 22, 2016

(54) HAPTIC FEEDBACK DEVICE AND HAPTIC FEEDBACK METHOD

(71) Applicant: Panasonic Corporation, Osaka (JP)

(72) Inventors: Yoshifumi Hirose, Kyoto (JP); Shoichi Araki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 271 days.

(21) Appl. No.: 14/008,233

(22) PCT Filed: Jan. 16, 2013

(86) PCT No.: PCT/JP2013/000142
§ 371 (c)(1),
(2) Date: Sep. 27, 2013

(87) PCT Pub. No.: WO2013/114792
PCT Pub. Date: Aug. 8, 2013

(65) Prior Publication Data
US 2014/0062927 A1 Mar. 6, 2014

(30) Foreign Application Priority Data
Jan. 31, 2012 (JP) ................................. 2012-017689

(51) Int. Cl.
*G06F 3/041* (2006.01)
*G06F 3/01* (2006.01)
*G06F 3/0484* (2013.01)

(52) U.S. Cl.
CPC ................ *G06F 3/016* (2013.01); *G06F 3/041* (2013.01); *G06F 3/0484* (2013.01); *G06F 2203/014* (2013.01)

(58) Field of Classification Search
CPC ....... G06F 3/016; G06F 3/041; G06F 3/0484; G06F 2203/014
USPC .................... 345/156–184; 386/68; 398/186; 715/702, 769
See application file for complete search history.

(56) References Cited

U.S. PATENT DOCUMENTS 5,554,980 A * 9/1996 Hashimoto et al. ........... 345/158
6,115,482 A * 9/2000 Sears et al. .................... 382/114
(Continued)

FOREIGN PATENT DOCUMENTS

JP          6-297383       10/1994
JP          7-121350       5/1995
(Continued)

OTHER PUBLICATIONS

Extended European Search Report issued May 15, 2015 in corresponding European patent application No. 13743679.6.
(Continued)

*Primary Examiner* — Prabodh M Dharia
(74) *Attorney, Agent, or Firm* — Wenderoth, Lind & Ponack, L.L.P.

(57) ABSTRACT

A haptic feedback device which provides haptic feedback to a user touching a panel, the haptic feedback device including: the panel; a position obtaining unit which obtains a first touch position touched on the panel by the user and a second touch position touched on the panel by the user after the first touch position; a speed calculation unit which calculates a speed of a touch starting at the first touch position and ending at the second touch position; a modulation signal generation unit which generates a modulation signal having a frequency component at a frequency that increases with the speed; a carrier signal generation unit which generates a carrier signal for vibrating the panel; a modulation unit which modulates the carrier signal using the modulation signal; and an actuator which provides haptic feedback to the user by vibrating the panel in accordance with the modulated carrier signal.

11 Claims, 16 Drawing Sheets

(56) References Cited

U.S. PATENT DOCUMENTS

| | | | |
|---|---|---|---|
| 6,807,861 B2* | 10/2004 | Omata | 73/627 |
| 8,059,875 B2 | 11/2011 | Uehara et al. | |
| 8,232,969 B2 | 7/2012 | Grant et al. | |
| 8,264,465 B2 | 9/2012 | Grant et al. | |
| 8,325,144 B1* | 12/2012 | Tierling | G06F 3/016 345/156 |
| 8,525,799 B1* | 9/2013 | Grivna et al. | 345/173 |
| 8,749,494 B1* | 6/2014 | Delker et al. | 345/173 |
| 2006/0097996 A1 | 5/2006 | Tabata | |
| 2006/0109256 A1* | 5/2006 | Grant et al. | 345/173 |
| 2006/0119586 A1 | 6/2006 | Grant et al. | |
| 2007/0077024 A1* | 4/2007 | Toyoda et al. | 386/68 |
| 2007/0291009 A1* | 12/2007 | Wright et al. | 345/173 |
| 2008/0205904 A1* | 8/2008 | Shinagawa et al. | 398/186 |
| 2009/0085878 A1 | 4/2009 | Heubel et al. | |
| 2009/0135164 A1 | 5/2009 | Kyung et al. | |
| 2009/0322695 A1* | 12/2009 | Cho et al. | 345/173 |
| 2010/0073304 A1 | 3/2010 | Grant et al. | |
| 2010/0283745 A1* | 11/2010 | Nikolovski | G06F 3/0436 345/173 |
| 2011/0002512 A1 | 1/2011 | Uehara et al. | |
| 2011/0096092 A1* | 4/2011 | Griswold | A61B 5/055 345/630 |
| 2011/0102349 A1 | 5/2011 | Harris | |
| 2011/0216032 A1* | 9/2011 | Oda | G06F 3/044 345/174 |
| 2011/0218737 A1* | 9/2011 | Gulati | G01V 1/28 702/16 |
| 2012/0023426 A1* | 1/2012 | Shen et al. | 715/769 |
| 2012/0036435 A1* | 2/2012 | Yang et al. | 715/702 |
| 2012/0200520 A1* | 8/2012 | Harris | G06F 3/016 345/173 |
| 2012/0235942 A1* | 9/2012 | Shahoian et al. | 345/173 |
| 2012/0299857 A1 | 11/2012 | Grant et al. | |
| 2013/0044049 A1* | 2/2013 | Biggs | G06F 3/016 345/156 |
| 2013/0215033 A1* | 8/2013 | Kehlstadt et al. | 345/163 |
| 2013/0285910 A1* | 10/2013 | Adachi | G06F 3/03547 345/159 |
| 2014/0071071 A1* | 3/2014 | Hirose | G06F 3/0488 345/173 |
| 2014/0210796 A1* | 7/2014 | Nikolovski | G06F 3/0436 345/177 |
| 2015/0241540 A1* | 8/2015 | Vernickel | G01R 33/56358 324/309 |
| 2015/0301338 A1* | 10/2015 | Van Heugten | G02C 7/04 345/8 |

FOREIGN PATENT DOCUMENTS

| | | |
|---|---|---|
| JP | 11-85400 | 3/1999 |
| JP | 2006-12184 | 1/2006 |
| JP | 2006-139371 | 6/2006 |
| JP | 2008-124760 | 5/2008 |
| JP | 2008-516348 | 5/2008 |
| JP | 2011-501296 | 1/2011 |
| JP | 2011-129047 | 6/2011 |
| JP | 2011-159110 | 8/2011 |
| JP | 2011-527792 | 11/2011 |
| WO | 2006/042309 | 4/2006 |
| WO | 2009/051976 | 4/2009 |
| WO | 2010/016627 A1 | 2/2010 |
| WO | 2010/016627 A8 | 2/2010 |
| WO | 2010/036641 | 4/2010 |

OTHER PUBLICATIONS

International Search Report issued Mar. 12, 2013 in International Application No. PCT/JP2013/000142.

Masashi Konyo et al., "Master-Slave Type Haptic Transmission System Representing Multiple Tactile Properties", 15th Robotics-symposia 2010 with partial English translation.

Takaaki Nara, "HapticInterface", Transactions of the Virtual Reality Society of Japan, Sep. 30, 1998, vol. 3, No. 3, pp. 89-94 ("A Tactile Display Using Elastic Waves") with partial English translation.

* cited by examiner

HAPTIC FEEDBACK DEVICE AND HAPTIC FEEDBACK METHOD

TECHNICAL FIELD

The present invention relates to haptic feedback devices which provide haptic feedback to a user touching a panel.

BACKGROUND ART

Public terminals (for example, automated teller machines (ATM) and ticket vending machines) which include touch panels are conventionally known. Moreover, the number of personal use devices (for example, tablet personal computers (PC) and smartphones) using touch panels is increasing.

Touch panels are input devices which detect touches made on the panel as inputs. Touch panels detect touches made by a user on a graphical user interface (GUI) object (a button, for example) displayed in the display region.

A benefit of user interfaces which use this kind of touch panel is that they have high flexibility with regard to positioning of GUI objects. However, user interfaces using this kind of touch panel provide less sensory feedback upon the press of a button compared to user interfaces using conventional, mechanical buttons. This can cause the user to be uncertain about whether a touch he or she made on the touch panel was correctly detected or not.

In light of this, a technique of providing haptic feedback by vibrating the touch panel has been proposed (for example, see Patent Literature 1 (PTL 1)). With the technique disclosed in PTL 1, in order to efficiently vibrate the touch panel, the frequency for vibrating the touch panel is varied based on the position touched on the touch panel (touch position).

CITATION LIST

Patent Literature

Japanese Unexamined Patent Application Publication (Translation of PCT Application) No. 2011-50295

SUMMARY OF INVENTION

However, with the above-described technique, there are cases in which it is difficult to provide appropriate haptic feedback to the user touching the panel.

For this reason, the present invention provides a haptic feedback device capable of appropriately providing haptic feedback to a user touching a panel.

A haptic feedback device which provides haptic feedback to a user touching a panel includes: the panel; a position obtaining unit configured to obtain a first touch position which is a position of a touch made on the panel by the user and a second touch position which is a position of a touch made on the panel by the user after the touch made at the first touch position; a speed calculation unit configured to calculate a speed of a touch starting at the first touch position and ending at the second touch position; a modulation signal generation unit configured to generate a modulation signal having a frequency component at a frequency that increases with the speed; a carrier signal generation unit configured to generate a carrier signal for vibrating the panel; a modulation unit configured to modulate the generated carrier signal using the modulation signal; and an actuator which provides haptic feedback to the user by vibrating the panel in accordance with the modulated carrier signal.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

The haptic feedback device according to an aspect of the present invention provides appropriate haptic feedback to a user touching a panel.

DETAILED DESCRIPTION

Figure 1:
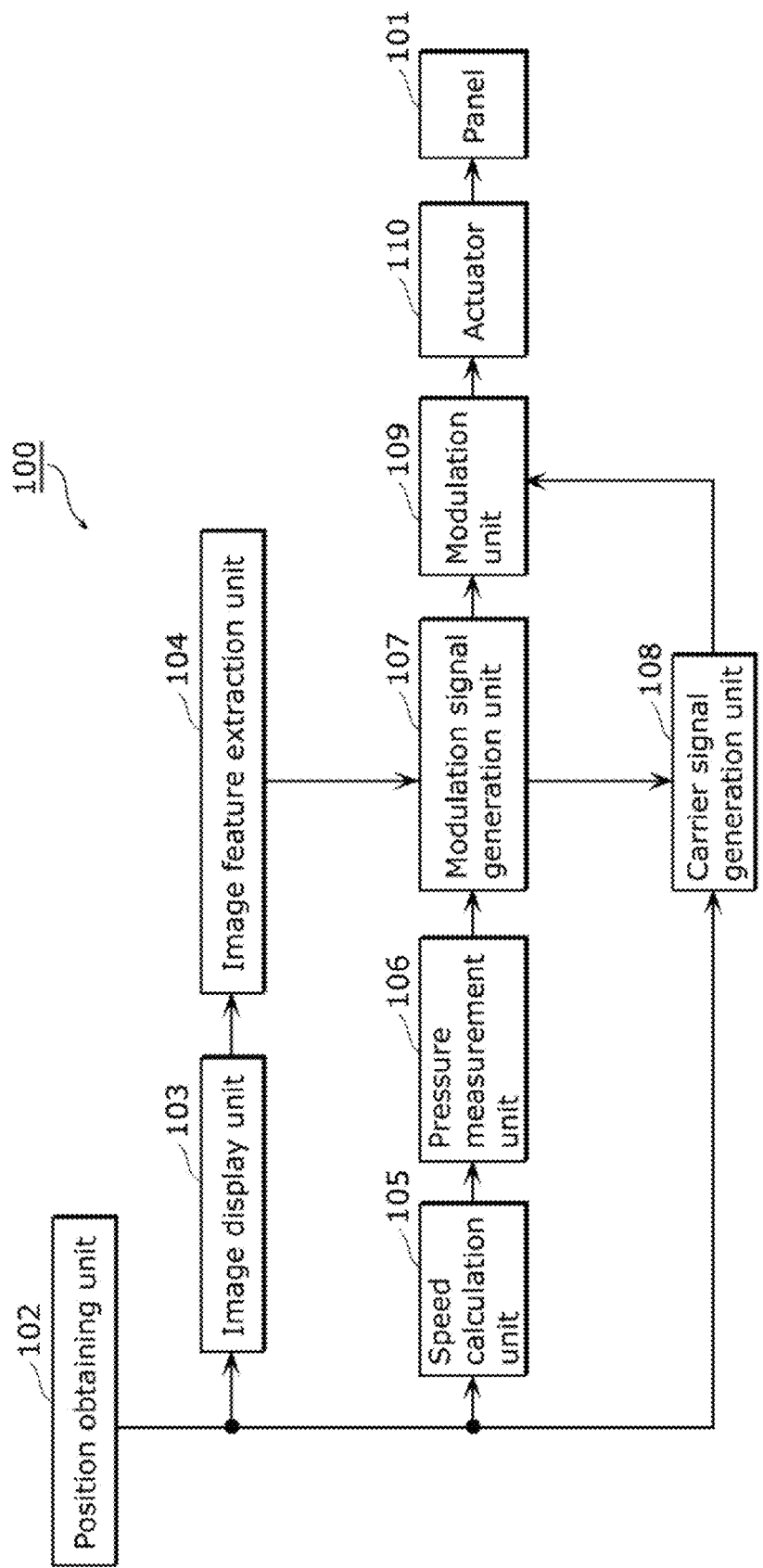
FIG. 1 is a block diagram of a haptic feedback device according to the first embodiment.

Underlying Knowledge Forming Basis of the Present Invention

With the above conventional technique, since the panel is vibrated at a frequency appropriate for the characteristics of the panel and the touch position, it is possible to effectively provide stronger haptic feedback to the user. However, simply providing strong haptic feedback when the user touches the panel does not necessarily mean that the haptic feedback is appropriate for the touch made.

For this reason, the haptic feedback device according to an aspect of the present invention provides haptic feedback to a user touching a panel, the haptic feedback device including:

the panel; a position obtaining unit configured to obtain a first touch position which is a position of a touch made on the panel by the user and a second touch position which is a position of a touch made on the panel by the user after the touch made at the first touch position; a speed calculation unit configured to calculate a speed of a touch starting at the first touch position and ending at the second touch position; a modulation signal generation unit configured to generate a modulation signal having a frequency component at a frequency that increases with the speed; a carrier signal generation unit configured to generate a carrier signal for vibrating the panel; a modulation unit configured to modulate the generated carrier signal using the modulation signal; and an actuator which provides haptic feedback to the user by vibrating the panel in accordance with the modulated carrier signal.

With this configuration, it is possible to modulate the carrier signal using the modulation signal having a frequency component at a frequency that increases with the speed of the touch, and vibrate the panel in accordance with the modulated carrier signal. As such, it is possible to increase the speed of change in amplitude of the vibration of the panel as the speed of the touch increases, and provide haptic feedback to the user touching the panel that is appropriate for the speed of the touch. This makes it possible for the user to easily confirm by touch that his or her touch has been correctly detected.

For example, the haptic feedback device may further include: an image display unit configured to display an image on the panel; and an image feature extraction unit configured to extract a feature of the image displayed on the panel, wherein the modulation signal generation unit is configured to generate the modulation signal having a frequency component at a frequency that increases with the speed and is dependent on the feature of the image.

With this configuration, it is possible to further adjust the frequency of the modulation signal based on a feature of the image. This makes it possible to provide haptic feedback dependent on the image displayed on the panel.

For example, the image feature extraction unit may be configured to extract, as the feature of the image, a spatial frequency of the image, and the modulation signal generation unit may be configured to generate the modulation signal having a frequency component at a frequency that increases with the speed and the spatial frequency.

With this configuration, it is possible to generate a modulation signal having a frequency component at a frequency that increases with the speed of the touch and the spatial frequency of the image. As such, it is possible to rapidly change the amplitude of the vibration of the panel when an image having a high spatial frequency is displayed, and provide haptic feedback to the user touching the panel that is appropriate for the image displayed on the panel.

For example, the image feature extraction unit may be configured to extract the feature of the image from a region that is a portion of the image and includes the second touch position.

With this configuration, it is possible to extract a feature of an image from a region including the second touch position. This makes it possible to generate a modulation signal appropriate for the image displayed at the touch position, and provide haptic feedback to the user touching the panel that is even more appropriate.

For example, the image feature extraction unit may be configured to extract the feature of the image from the region having a size that increases with the speed.

With this configuration, it is possible to extract a feature of an image from a region that increases in size with the speed of the touch. This makes it possible to extract a feature of an image from a region appropriate for the speed of the touch.

Moreover, the image feature extraction unit may be configured to extract the feature of the image each time the image displayed on the panel is updated, and the modulation signal generation unit may be configured to generate the modulation signal each time the feature of the image is extracted.

With this configuration, it is possible to extract a feature of an image each time the image is updated. This makes it possible to extract a feature of an image in synchronization with a change in the image shown on the panel. This in turn makes it possible to provide natural haptic feedback in coordination with visual perception of the user.

For example, the carrier signal generation unit may be configured to generate the carrier signal having a frequency component at a frequency dependent on the feature of the image.

With this configuration, it is possible to generate a carrier signal having a frequency component at a frequency dependent on a feature of the image. This makes it possible to vibrate the panel based on the feature of the image, and provide appropriate haptic feedback to a user touching a panel.

For example, the image feature extraction unit may be configured to extract, as the feature of the image, a spatial frequency of the image, and the carrier signal generation unit may be configured to generate the carrier signal having a frequency component at a frequency that increases with the spatial frequency.

With this configuration, it is possible to generate a carrier signal having a frequency component at a frequency that increases with the spatial frequency of the image. As such, it is possible to increase the frequency of the vibration of the panel when an image having a high spatial frequency is displayed, and provide haptic feedback to the user touching the panel that is appropriate for the image displayed on the panel.

For example, the haptic feedback device may further include a carrier frequency determination unit configured to determine a resonance frequency to be used for a frequency for the carrier signal from among a plurality of resonance frequencies of the panel, the determined resonance frequency increasing with the spatial frequency, wherein the carrier signal generation unit may be configured to generate the carrier signal having a frequency component at the determined resonance frequency.

With this configuration, it is possible to generate a carrier signal having a frequency component at a resonance frequency that increases with the spatial frequency of the image. This makes it possible to effectively vibrate the panel while providing haptic feedback appropriate for the image displayed on the panel.

For example, the carrier signal generation unit may be configured to generate the carrier signal having a frequency component at a resonance frequency of the panel.

With this configuration, it is possible to generate a carrier signal having a frequency component at a resonance frequency of the panel, and effectively vibrate the panel.

For example, the carrier signal generation unit may be configured to generate the carrier signal having a frequency component at a resonance frequency among a plurality of resonance frequencies of the panel that corresponds to the second touch position.

With this configuration, it is possible to generate a carrier signal having a frequency component at a resonance frequency which corresponds to the second touch position. This makes it possible to generate a carrier signal having a frequency component at a resonance frequency that can effectively vibrate the touch position, and effectively vibrate the panel.

For example, the haptic feedback device may further include a hardness obtaining unit configured to obtain a value indicating a hardness of an object included in the image, wherein the carrier signal generation unit may be configured to generate the carrier signal having a frequency component at a frequency that increases with the value indicating the hardness.

With this configuration, it is possible to generate a carrier signal having a frequency component at a frequency that increases with a value indicating hardness of an object included in the image. This makes it possible to provide haptic feedback close to the haptic feedback felt when the user touches the actual object, and thus provide appropriate haptic feedback to the user touching the panel.

For example, the haptic feedback device may further include a pressure measurement unit configured to measure a pressure of the touch made at the second touch position, wherein the modulation signal generation unit may be configured to generate the modulation signal having a frequency component at a frequency that increases with the measured pressure.

With this configuration, it is possible to generate a modulation signal having a frequency component at a frequency that increases with the pressure of the touch. This makes it possible to provide haptic feedback to the user touching the panel that is appropriate for the pressure of the touch.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, embodiments are specifically described with reference to the Drawings.

Each of the embodiments described below shows a general or specific example. The numerical values, shapes, materials, structural elements, the arrangement and connection of the structural elements, steps, the processing order of the steps etc. shown in the following embodiments are mere examples, and therefore do not limit the scope of the Claims. Therefore, among the structural elements in the following embodiments, structural elements not recited in any one of the independent claims are described as arbitrary structural elements.

First Embodiment

FIG. 1 is a block diagram of the haptic feedback device 100 according to the first embodiment. The haptic feedback device 100 provides haptic feedback to a user touching a touch panel.

As FIG. 1 shows, the haptic feedback device 100 includes a panel 101, a position obtaining unit 102, an image display unit 103, an image feature extraction unit 104, a speed calculation unit 105, a pressure measurement unit 106, a modulation signal generation unit 107, a carrier signal generation unit 108, a modulation unit 109, and an actuator 110.

Next, each structural element of the haptic feedback device 100 will be described.
(Panel 101)

Figure 2:
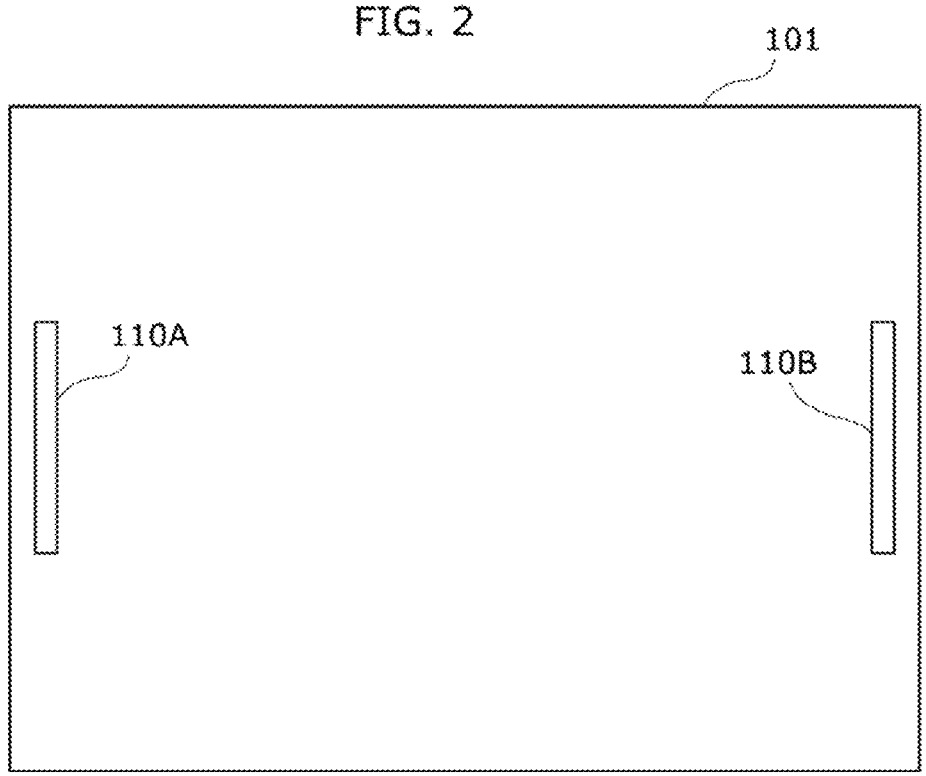
FIG. 2 is a planar view of the panel according to the first embodiment.

FIG. 2 is a planar view of the panel 101 according to the first embodiment. The panel 101 receives a touch input from a user. Moreover, the panel 101 conveys vibrations for providing haptic feedback to the user touching the surface of the panel 101. Furthermore, an image is displayed on the panel 101 by the image display unit 103.

In the first embodiment, the panel 101 is a touch display. More specifically, the panel 101 includes, for example, an electrostatic capacitive or pressure sensitive touch panel and a liquid crystal display or organic EL display device. The surface of the panel 101 is, for example, a plate-like member of glass or acrylic.

It should be noted that the panel 101 has at least one resonance frequency. A resonance frequency is a frequency at which the panel 101 naturally vibrates (natural frequency). The resonance frequency of the panel 101 depends on, for example, the material and size of the panel 101.
(Position Obtaining Unit 102)

The position obtaining unit 102 obtains a position touched on the panel 101 (touch position) by the user when the user touches the panel 101. Hereinafter, two touch positions touched at different times are sometimes differentiated as the first touch position and the second touch position.

The position obtaining unit 102 obtains a touch position by, for example, electrostatic capacitive method or pressure sensitive method. More specifically, the position obtaining unit 102 obtains, at predetermined time intervals, as the touch position, a central position of a region on the panel 101 touched by the user with his or her finger or a stylus pen (contact region). Moreover, the position obtaining unit 102 may obtain the center of gravity of the load in the contact region as the touch position. It should be noted that, regarding the method of obtaining the touch position, the touch panel is not necessarily limited to an electrostatic capacitive touch panel or resistive touch panel.
(Image Display Unit 103)

The image display unit 103 is, for example, a graphics processing unit (GPU), and displays an image on the panel 101. The image display unit 103 displays, for example, an image of a stripe pattern like that shown in FIG. 3 on the panel 101.

Figure 3:
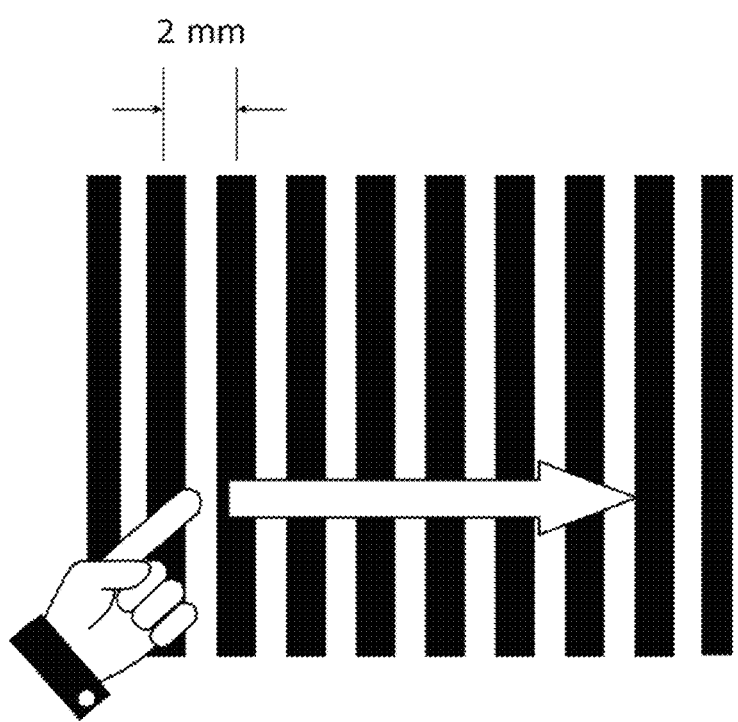
FIG. 3 is an example of an image displayed on the panel.

It should be noted that the image that the image display unit 103 displays is not limited to the sort of image shown in FIG. 3 The image display unit 103, for example, may display a GUI object on the panel 101. Moreover, the image display unit 103 may display an image captured by a camera on the panel 101.

The image display unit 103 may update the condition of the image being displayed based on a touch operation made by the user. For example, the image display unit 103 may update the condition of the image based on temporal changes in the touch position (for example, a pinch-in, pinch-out, or flick motion) obtained by the position obtaining unit 102.

More specifically, the image display unit 103, for example, shrinks the displayed image when a pinch-in motion is detected. Moreover, the image display unit 103, for example, expands the displayed image when a pinch-out motion is detected. Moreover, when a flick motion is detected, the image display unit 103, for example, moves the displayed image in the direction of the flick. It should be noted that the method of updating the condition of the image is not limited to these examples.

It should be noted that the image display unit 103 may update the image being displayed based on information other than the type of touch made by the user. For example, the image display unit 103 may move the image in the direction in which the panel 101 is tilted.
(Image Feature Extraction Unit 104)

The image feature extraction unit 104 extracts a feature of the image being displayed on the panel 101. A feature of the image is, for example, texture information or shape information. More specifically, a feature of the image is the spatial frequency or intensity of the image.

For example, the image feature extraction unit 104 extracts the spatial frequency from the image by performing discrete Fourier transformation (DFT) on the image.

More specifically, when, for example, the spatial frequency or intensity of the image displayed on the panel 101 is uniform throughout, the image feature extraction unit 104 may obtain, as a feature of the image, the spatial frequency or intensity at a given point on the panel 101. Moreover, when, for example, the spatial frequency or intensity of the image displayed on the panel 101 is not uniform throughout, the image feature extraction unit 104 may obtain, as a feature of the image, the spatial frequency or intensity from the surrounding area of the touch position obtained by the position obtaining unit 102. In other words, the image feature extraction unit 104 may extract a feature of the image from a region of the image that includes the second touch position.

At this time, the image feature extraction unit 194 may obtain a localized spatial frequency or intensity by extracting image information using an appropriate window function, for example. With this, the image feature extraction unit 104 is capable of extracting a feature dependent on the touch position.

It should be noted that the image feature extraction unit 104 may extract the feature each time the image displayed on the panel 101 is updated. This enables the image feature extraction unit 104 to extract a feature of the image in synchronization with the changes in condition of the displayed image. In this case, the image feature amount λ which quantitatively indicates a feature of the image is represented as a function of time, as Equation 1 shows.

[Math 1]

$$\lambda_i = \lambda_i(t) \quad (1)$$

It should be noted that the image feature extraction unit 104 may extract a feature of the image at predetermined time intervals, for example. In this case, the shorter the predetermined time interval is, the faster the image feature extraction unit 104 can keep up with changes in the image being displayed while extracting a feature of the image.

(Speed Calculation Unit 105)

The speed calculation unit 105 calculates the speed of a touch made by the user (touch speed). More specifically, the speed calculation unit 105 calculates the touch speed by obtaining a time (touch time) at which the first touch position obtained by the position obtaining unit 102 was touched and a time (touch time) at which the second touch position obtained by the position obtaining unit 102 was touched. Even more specifically, the speed calculation unit 105 calculates the touch speed with Equation 2, using the second touch position $(x_t, y_t)$ touched at time t and the first touch position $(x_{t-1}, y_{t-1})$ touched at time $(t-\Delta t)$, for example.

[Math 2]

$$v_x = \frac{x_t - x_{t-1}}{\Delta t}$$
$$v_y = \frac{y_t - y_{t-1}}{\Delta t} \quad (2)$$

Here, $v_x$ is the touch speed in the left-right direction (horizontal direction), and $v_y$ is the touch speed in the up-down direction (vertical direction).

It should be noted that the position obtaining unit 102 may, for example, associate corresponding ones of the touch position and touch time, and store this information in memory. In this case, the speed calculation unit 105 may obtain the first touch position and the corresponding touch time from memory.

(Pressure Measurement Unit 106)

The pressure measurement unit 106 measures a pressure of the touch (touch pressure) made at, the touch position obtained by the position obtaining unit 102. Alternatively, the pressure measurement unit 106 may measure the pressure from the finger contact surface area at the touch position.

Touch pressure can be obtained using a pressure sensitive touch panel or a load sensor.

(Modulation Signal Generation Unit 107)

The modulation signal generation unit 107 generates a modulation signal using the feature of the image extracted by the image feature extraction unit 104. A spatial frequency or intensity of the image, for example, is used as the feature of the image. More specifically, the modulation signal generation unit 107, for example, generates a modulation signal having a frequency component at a frequency dependent on the feature of the image extracted by the image feature extraction unit 104. For example, the modulation signal generation unit 107 refers to a table which associates the feature of the image and a frequency, or a mathematical formula expressing a relationship between the feature of the image and a frequency, and determines a frequency based on the feature of the image.

Moreover, for example, the modulation signal generation unit 107 may generate a modulation signal having a frequency component at a frequency that increases with the spatial frequency of the image. Vibrating the panel in accordance with a carrier signal modulated using this sort of modulation signal allows the haptic feedback device 100 to provide strong haptic feedback to the user when the spatial frequency of the image is high. As such, the haptic feedback device 100 is capable of providing haptic feedback close to the sense of touch the user expects based on the image shown.

It should be noted that the modulation signal generation unit 107 may generate a modulation signal using the touch speed calculated by the speed calculation unit 105 in addition to the feature of the image extracted by the image feature extraction unit 104. More specifically, the modulation signal generation unit 107 may, for example, generate a modulation signal having a frequency component at a frequency that increases with the touch speed.

Next, generation of the modulation signal using both the touch speed and the spatial frequency will be described.

Figure 4A:
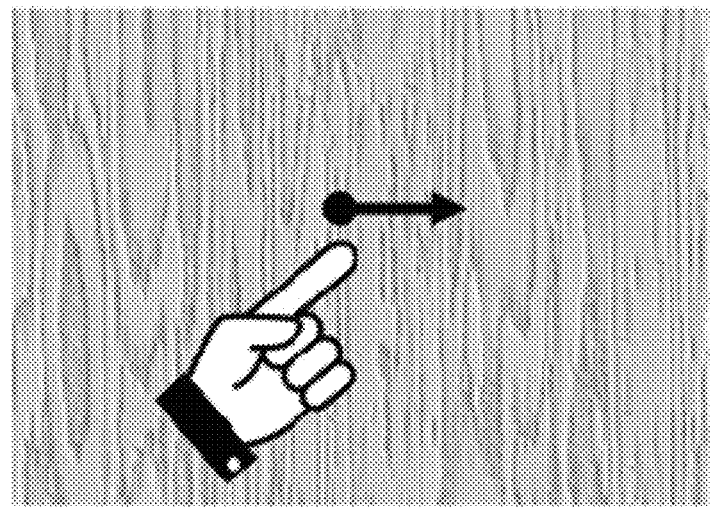
FIG. 4A is an example of an image displayed on the panel.

For example, when the image displayed on the panel 101 is a texture image such as the one shown in FIG. 4A, the image feature extraction unit 104 extracts a region of the image including the current touch position (the second touch position). The image feature extraction unit 104 then obtains a spatial frequency feature such as the one shown in FIG. 4B by performing Fourier transform on the extracted image. The image feature extraction unit 104 obtains the spatial frequency using the spatial frequency feature obtained in this manner.

For example, the image feature extraction unit 104 extracts, as the image feature amount $\lambda_i$, a spatial frequency component stronger than a predetermined strength from among the spatial frequency components in the moving direction of the touch. In the example shown in FIG. 4B, the image feature extraction unit 104 extracts spatial frequency $\lambda_1$ and $\lambda_2$ as the image feature amount. Moreover, for example, the image feature extraction unit 104 may extract, as the image feature amount, the spatial frequency component that is the strongest among the spatial frequency components in the moving direction of the touch.

It should be noted that the image feature extraction unit 104 may extract a large region when the touch speed is high, and extract a small region when the touch speed is low. In other words, the image feature extraction unit 104 may extract the feature of the image from a region that increases in size with the touch speed. More specifically, the image feature extraction unit 104 may, for example, extract a region whose length is based on the touch speed in the movement direction of the touch from the touch position. With this, the image feature extraction unit 104 is capable of extracting a feature of an image from a region appropriate for the touch speed. Moreover, the image feature extraction unit 104 is capable of resolving the discontinuity of the signal resulting from the extraction, by using an appropriate window function, such as a Hanning window.

Next, a specific example of the generation of a modulation signal using the spatial frequency of the image and the touch speed will be given.

For example, when the user touches an image by tracing his or her finger across the image, and the image displayed on the panel 101 has a stripe pattern like that shown in FIG. 3, the modulation signal generation unit 107 generates a modulation signal using Equation 3.

[Math 3]

$$s_m(t) = \sum_{i=1}^{n} A_i \sin(2\pi\lambda_i(t)v(t)t) \quad (3)$$

Here, $s_m$ is the modulation signal, $\lambda_i$ is the strength of the i-th spatial frequency component, $\lambda_i$ (1/mm) is the i-th spatial frequency, and v (mm/s) is the touch speed. In the example shown in FIG. 3 since the projections and recessions are positioned at 2 mm intervals, a single spatial frequency (n=1) is extracted as image feature amount $\lambda_1$=0.5(1/mm). Here, the modulation signal generation unit 107 generates, as the modulation signal, a sine wave at a frequency proportionate to the touch speed v and the image feature amount $\lambda_1$.

Next, a modulation signal and a carrier signal (haptic signal) modulated using the modulation signal when the touch speed and the spatial frequency vary will be described using FIG. 5 through FIG. 7.

Figure 5:
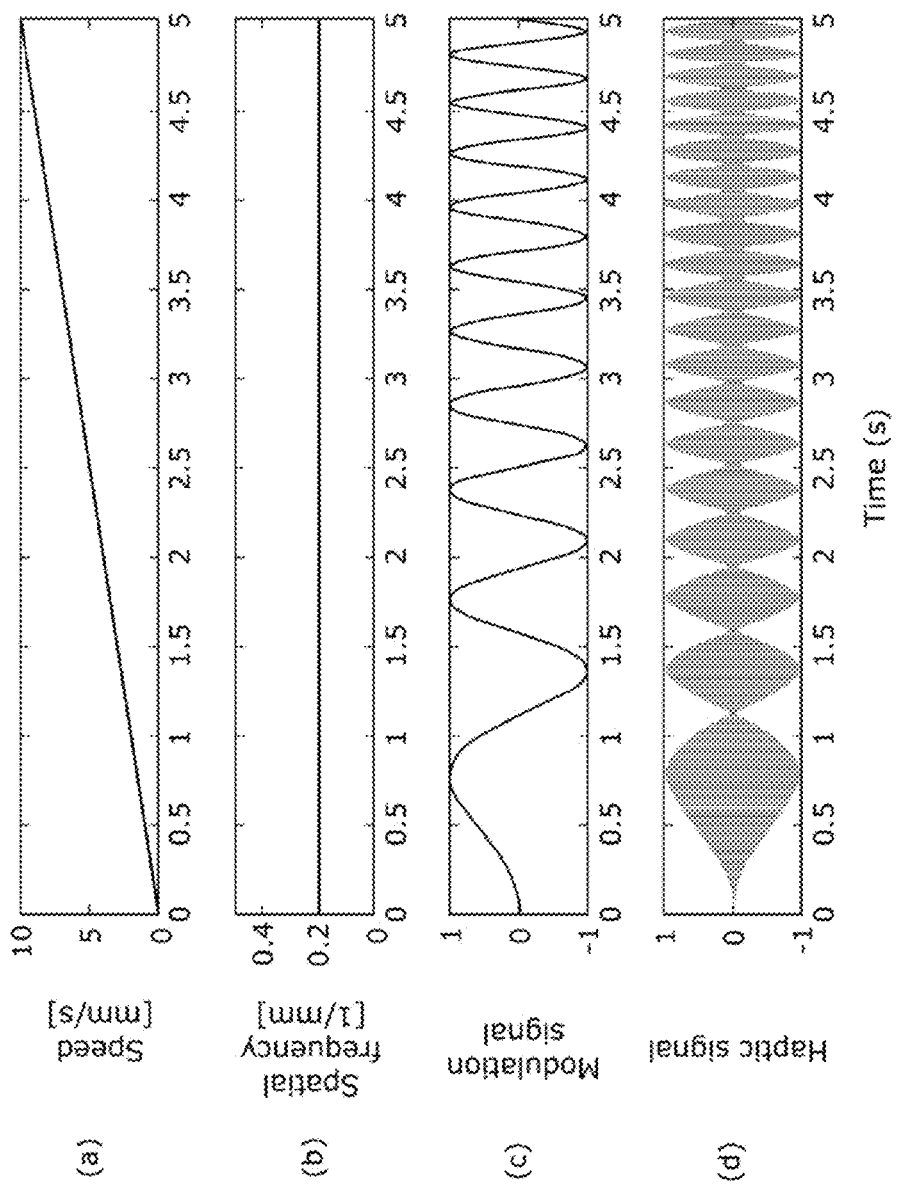
FIG. 5 is a graph showing the touch speed monotonically increasing and showing the modulation signal and the haptic signal when the spatial frequency is constant.
Figure 6:
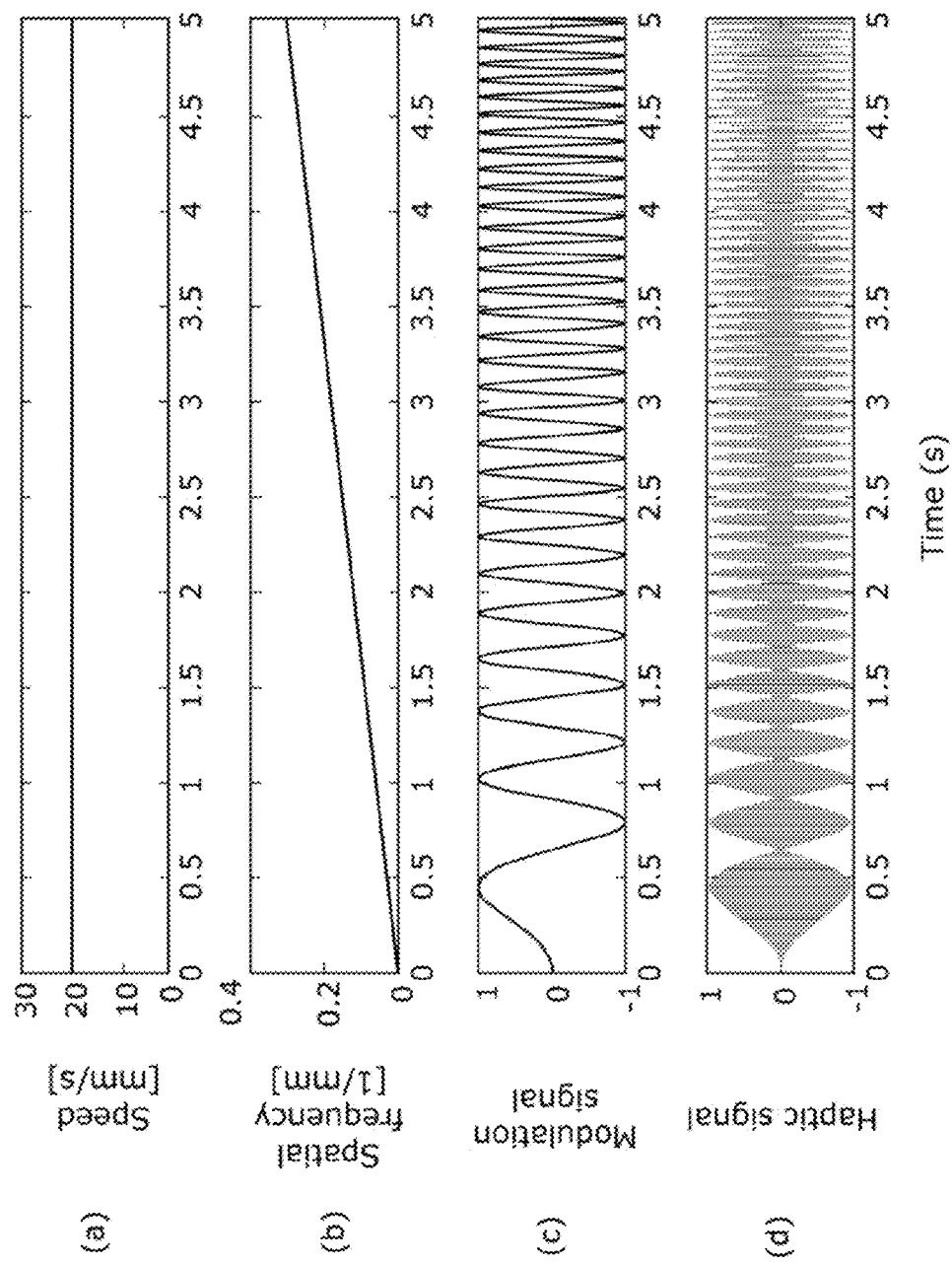
FIG. 6 is a graph showing a constant touch speed and showing the modulation signal and the haptic signal when the spatial frequency is monotonically increasing.
Figure 7:
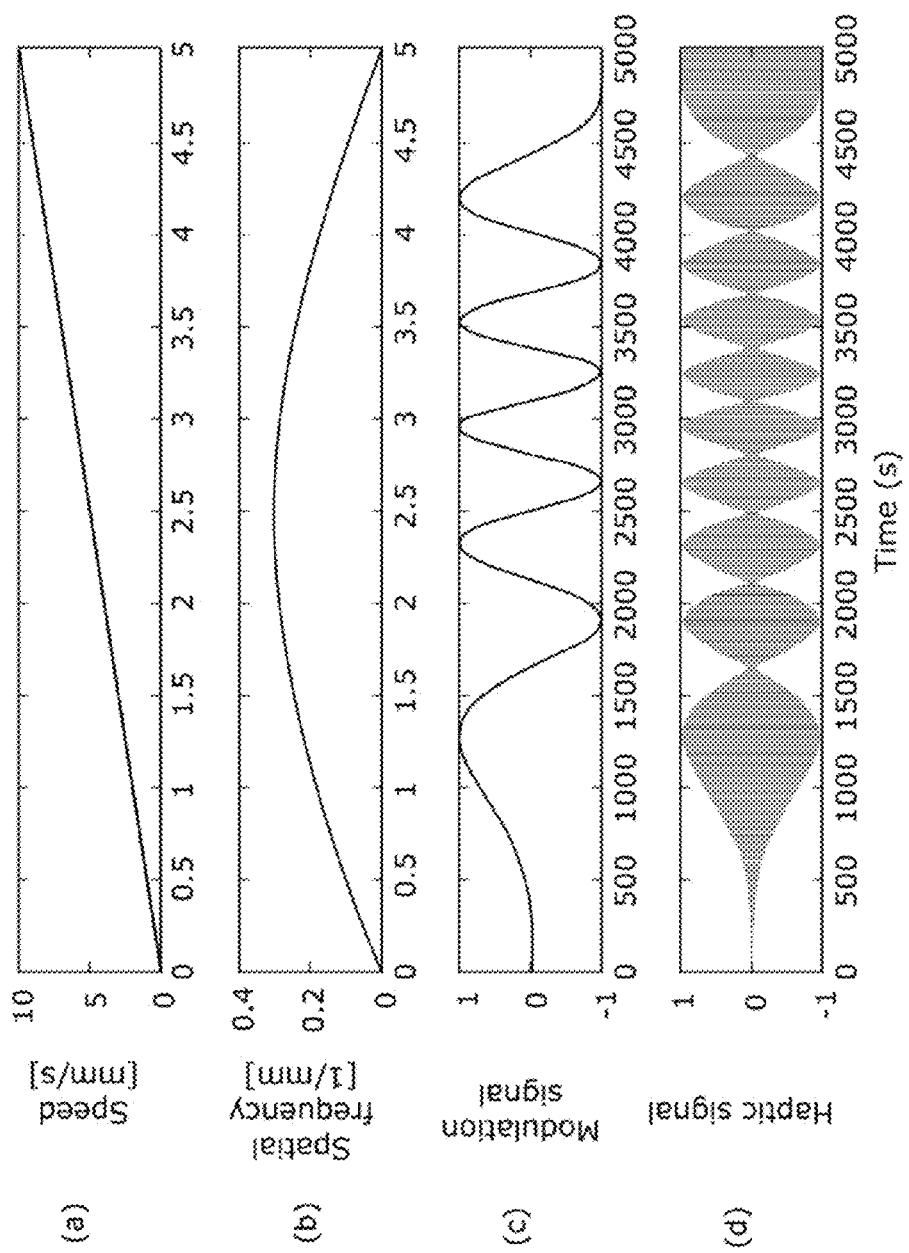
FIG. 7 is a graph showing the touch speed monotonically increasing and showing the modulation signal and the haptic signal when the spatial frequency decreases after increasing.

In FIG. 5 through FIG. 7, (a) is a graph showing the variation in the touch speed overtime, (b) is a graph showing the variation in the spatial frequency of the image overtime, (c) is a graph showing the modulation signal, and (d) is a graph showing the haptic signal.

FIG. 5 shows the touch speed monotonically increasing, and shows the modulation signal and the haptic signal when the spatial frequency is constant.

In (a) in FIG. 5, the touch speed v (t) monotonically increases from 0 (mm/s) to 10 (mm/s). Moreover, in (b) in FIG. 5, the spatial frequency of the image displayed on the panel 101 is constant at 0.2 (1/mm). In this case, the modulation signal generation unit 107 generates a modulation signal like the one shown in (c) of FIG. 5 using Equation 3. Moreover, a carrier signal (haptic signal) modulated by the modulation signal shown in (c) in FIG. 5 is shown in (d) in FIG. 5.

FIG. 6 shows a constant touch speed, and shows the modulation signal and the haptic signal when the spatial frequency monotonically increases.

In (a) in FIG. 6, the touch speed v (t) is constant at 20 mm/s. Moreover, in (b) in FIG. 6, the spatial frequency of the image monotonically increases from 0 (1/mm) to 0.3 (1/mm). In this case, the modulation signal generation unit 107 generates a modulation signal like the one shown in (c) of FIG. 6 using Equation 3. Moreover, a carrier signal (haptic signal) modulated by the modulation signal shown in (c) in FIG. 6 is shown in (d) in FIG. 6.

FIG. 7 shows the touch speed monotonously increasing, and shows the modulation signal and the haptic signal when the spatial frequency decreases after increasing.

In (a) in FIG. 7, the touch speed v (t) monotonically increases from 0 mm/s to 10 mm/s. Moreover, in (b) in FIG. 7, the spatial frequency of the image monotonically increases from 0 (1/mm) to 0.3 (1/mm), and decreases to 0 (1/mm) thereafter. The variation in spatial frequency over time shown in (b) in FIG. 7 occurs when, for example, the image displayed on the panel 101 is enlarged after being reduced in size.

In this case, the modulation signal generation unit 107 generates the modulation signal shown in (c) of FIG. 7 using Equation 3. Moreover, in this case, a carrier signal (haptic signal) modulated by the modulation signal shown in (c) in FIG. 6 is shown in (d) in FIG. 7.

In other words, while the spatial frequency is increasing (the image is being reduced in size) at the same time as the touch speed is increasing, the frequency of the modulation signal increases. In other words, while the spatial frequency is increasing (the image is being reduced in size) at the same time as the touch speed is increasing, the frequency of the modulation signal increases.

It should be noted that the modulation signal generation unit 107 may generate a modulation signal using the touch pressure measured by the pressure measurement unit 106 in addition to the feature of the image extracted by the image feature extraction unit 104. More specifically, the modulation signal generation unit 107 may, for example, generate a modulation signal having a frequency component at a frequency that increases with the touch pressure. This allows the haptic feedback device 100 to provide strong haptic feedback when the user touches the panel 101 strongly.

It should be noted that the modulation signal generation unit 107 may generate a modulation signal using the intensity at the touch position as the feature of the image. More specifically, the modulation signal generation unit 107 generates a modulation signal having an amplitude corresponding to the intensity at the touch position.

Next, an even more specific example of when the modulation signal is generated using intensity as the feature of the image will be given.

The modulation signal generation unit 107, for example, generates a modulation signal having an amplitude which increases with the intensity of the image at the touch position. With this, when, for example, the intensity corresponds to depth-wise direction in the scene (for example, when strong light is coming from in front of the subject), the modulation signal includes a frequency component at a frequency which increases with depth-wise change. As a result, the haptic feedback device 100 is capable of providing haptic feedback as the user generally would expect from the image.

It should be noted that intensity and depth in a scene sometimes have the relationship shown by Equation 4, for example.

[Math 4]

$$D(x,y)=1/B(x,y) \quad (4)$$

Here, D represents the depth of the scene in a position (x, y) on the panel 101. Moreover, B represents the intensity at the position (x, y) on the panel 101. In this case, the modulation signal generation unit 107 generates a modulation signal using, for example, Equation 5.

[Math 5]

$$s_m(t) = \frac{1}{D(p(t))} = B(p(t)) \quad (5)$$

Here, D (p(t)) represents the depth at the touch position p (t)=(x, y) made at time t. Moreover, B (p(t)) represents the intensity at the touch position p (t)=(x, y) made at time t.

It should be noted that the generation method of the modulation signal generated by the modulation signal generation unit 107 is not limited to this example, and may be a method which varies proportionally to depth information.

(Carrier Signal Generation Unit 108)

The carrier signal generation unit 108 generates a carrier signal for vibrating the panel 101. In other words, the carrier signal generation unit 108 generates a carrier signal having a frequency dependent on a vibration characteristic of the panel 101. In other words, the carrier signal generation unit 108 generates a carrier signal having a frequency component at a frequency appropriate for vibrating the panel 101. More specifically, the carrier signal generation unit 108 generates, as the carrier signal $s_c$, a sine wave of the frequency $F_c$, as Equation 6 shows.

[Math 6]

$$S_c(t) = \sin(2\pi F_c t) \quad (6)$$

Hereinafter, there are instances where the frequency $F_c$ referred to as the frequency of the carrier signal.

It should be noted that the frequency of the carrier signal may be a resonance frequency of the panel 101. In other words, the carrier signal generation unit 108 may generate the carrier signal having a frequency component at a resonance frequency of the panel. This allows the haptic feedback device 100 to efficiently vibrate the panel 101 and provide haptic feedback to the user with low energy.

Figure 8:
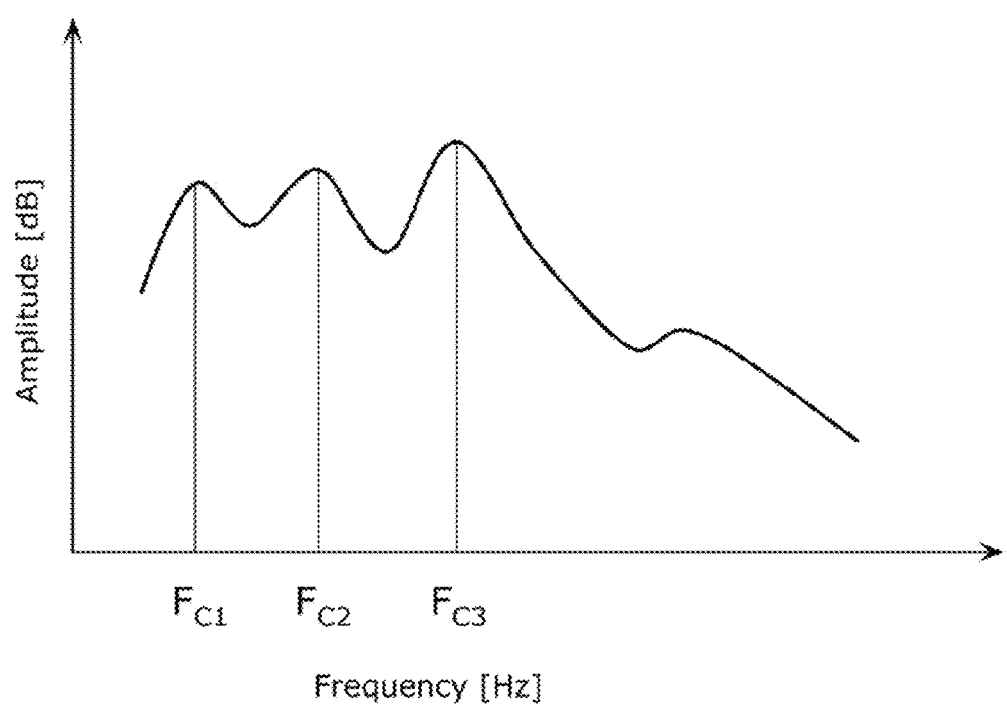
FIG. 8 is an example of the vibration characteristics of the panel.

FIG. 8 shows an example of the vibration characteristics of the panel 101. As FIG. 8 shows, when there are a plurality of resonance frequencies, the carrier signal generation unit 108 may generate the carrier signal having a frequency component $F_{c3}$ at a resonance frequency that is the strongest resonance frequency. This allows the haptic feedback device 100 to efficiently vibrate the panel 101 even further, thereby making is possible to further conserve energy.

It should be noted that there are instances where the vibration characteristics of the panel 101 differ depending on position on the panel 101. In other words, the carrier signal generation unit 108 may generate the carrier signal having a frequency component at a resonance frequency that is an average value of the plurality of resonance frequencies appropriate for a plurality of positions on the panel 101. Alternatively, the carrier signal generation unit 108 may generate the carrier signal having a frequency component at a resonance frequency appropriate for the touch position obtained by the position obtaining unit 102. In other words, the carrier signal generation unit 108 may generate the carrier signal having a frequency component at a resonance frequency corresponding to the touch position, from among the plurality of resonance frequencies of the panel 101.

(Modulation Unit 109)

The modulation unit 109 modulates the carrier signal generated by the carrier signal generation unit 108 using the modulation signal generated by the modulation signal generation unit 107. More specifically, the modulation unit 109 performs, for example, amplitude modulation (AM). Even more specifically, the modulation unit 109 may perform amplitude modulation on the carrier signal using, for example, Equation 7.

[Math 7]

$$s(t) = s_m(t)s_c(t) \quad (7)$$

Here, s is the haptic signal, $s_m$ is the modulation signal, and $s_c$ is the carrier signal.

Moreover, the modulation unit 109 may perform amplitude modulation on the carrier signal using, for example Equation 8.

[Math 8]

$$s(t) = \frac{1 + s_m(t)}{2} s_c(t) \quad (8)$$

(d) in FIG. 5, (d) in FIG. 6, and (d) in FIG. 7 each show an example of an actual modulated carrier signal (haptic signal). The modulation unit 109 generates the haptic signal for driving the actuator 110 by performing amplitude modulation on the carrier signal using the modulation signal.

It should be noted that the haptic signal generated by the modulation unit 109 is amplified as needed in order to drive the actuator 110. The method of amplification is not limited to any particular method. Moreover, the specific amplification rate may be determined based on the specifications of the actuator 110.

(Actuator 110)

The actuator 110 is driven by the carrier signal (haptic signal) modulated by the modulation unit 109, and vibrates the panel 101. Vibration of the panel 101 provides haptic feedback to the user. In other words, the actuator 110 provides haptic feedback to the user by vibrating the panel 101 in accordance with the modulated carrier signal.

The actuator 110 is, for example, applied to the panel 101. Far example, as FIG. 2 shows, the actuator 110, which includes the first actuator 110A and the second actuator 110B, is positioned at the periphery of the panel 101. By being positioned at the periphery of the panel 101, there is no need to position the actuator 110 in the region in which images are displayed, making it possible to increase the degree of freedom in design.

It should be noted that the number of actuators is not limited to two. In other words, the actuator 110 may include only one actuator, or may include three or more actuators.

While the type of actuator 110 is not particularly limited to any single type, it is possible to vibrate the panel 101 by using, for example, a piezoelectric element as the actuator 110. Alternatively, a voice coil may be used as the actuator 110.

It should be noted that the actuator 110 may include an amplifier for amplifying the haptic signal. When an amplifier is included, the actuator 110 may by driven using an amplified haptic signal. It should be noted that the actuator 110 may be driven using the haptic signal amplified by the carrier signal generation unit 108. By being driven with an amplified haptic signal, the driving energy of the actuator 110 can be further increased, and the actuator 110 is capable of providing strong haptic feedback to the user.

Figure 9:
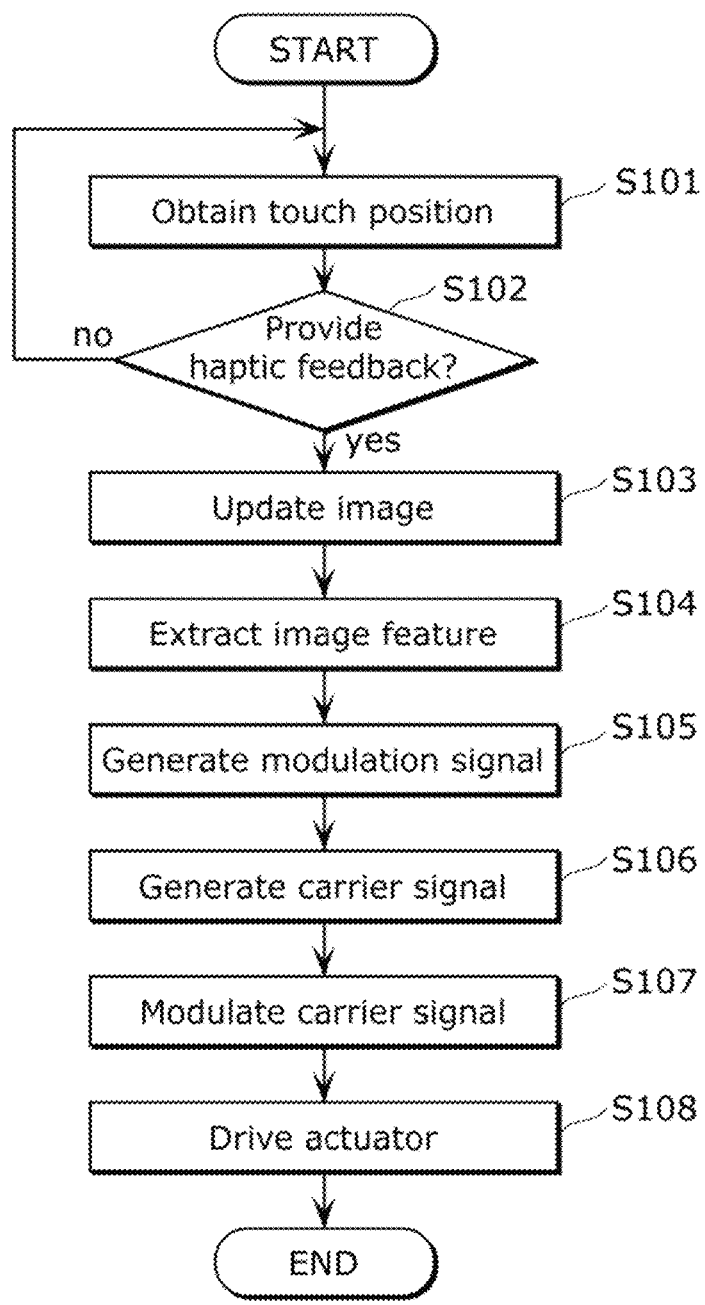
FIG. 9 is a flow chart of the processes performed by the haptic feedback device according to the first embodiment.

Next, examples of operations performed by the haptic feedback device 100 having the above-described configuration will be described. FIG. 9 is a flow chart of the processes performed by the haptic feedback device 100 according to the first embodiment.

(Step S101)

The position obtaining unit 102 obtains a position touched on the panel 101 (touch position) by the user at predetermined time intervals.

(Step S102)

The position obtaining unit 102 determines whether haptic feedback is necessary or not based on the touch position obtained in step S101.

For example, when an image having a striped texture, like the one shown in FIG. 3, is displayed, the position obtaining unit 102 determines whether haptic feedback is necessary based on whether or not the touch position is in a region of the stripe-textured image. When buttons are displayed as GUI objects, the position obtaining unit 102 determines whether haptic feedback is necessary based on whether or not the touch position is in the region the button. If haptic feedback is determined to be necessary, processing proceeds to step S103. If haptic feedback is not determined to be necessary, processing returns to step S101.

It should be noted that the criteria for determining whether or not haptic feedback is necessary is not limited to the above example. For example, when an mage is displayed on the panel 101, the position obtaining unit 102 may determine that haptic feedback is necessary when the touch position is in a region of the image and the touch position is moving.

(Step S103)

The image display unit 103 updates the condition of the image displayed on the panel 101 based on the touch position obtained by the position obtaining unit 102.

(Step S104)

The image feature extraction unit 104 extracts a feature of the image being displayed on the panel 101 at predetermined time intervals.

(Step S105)

The modulation signal generation unit 107 generates a modulation signal using the feature of the image extracted in step S104.

(Step S106)

The carrier signal generation unit 108 generates a carrier signal for vibrating the panel 101.

(Step S107)

The modulation unit 109 modulates the carrier signal generated in step S106 using the modulation signal generated in step S105.

(Step S108)

The actuator 110 provides haptic feedback to the user by vibrating the panel 101 in accordance with the carrier signal (haptic signal) modulated in step S107.

This allows the haptic feedback device 100 to provide haptic feedback dependent on the feature of the age displayed on the panel 101 to the user.

As described above, with the haptic feedback device 100 according to the first embodiment, it is possible to provide haptic feedback based on the image displayed on the panel 101 by vibrating the panel 101. Moreover, even when the image displayed on the panel 101 changes, the haptic feedback device 100 is capable of providing natural haptic feedback in coordination with visual perception of the user since changes in the image can be reflected in touch as needed.

Furthermore, with the haptic feedback device 100 according to the first embodiment, it is possible to modulate the carrier signal using the modulation signal having a frequency component at a frequency that increases with the speed of the touch, and vibrate the panel in accordance with the modulated carrier signal. As such, the haptic feedback device 100 is capable of changing the amplitude of the vibration of the panel more rapidly as the speed of the touch increases, and capable of providing haptic feedback to the user touching the panel that is appropriate for the speed of the touch. This makes it possible for the user to easily confirm by sense of touch that his or her touch has been correctly detected.

Second Embodiment

Hereinafter, the second embodiment is described in detail with reference to the Drawings.

The haptic feedback device according to the second embodiment differs from that haptic feedback device according to the first embodiment in that the frequency of the carrier signal is changed based on a feature of the image. The following description will focus on this point. It should be noted that details regarding structural elements in common with the first embodiment are omitted in the following description.

Figure 10:
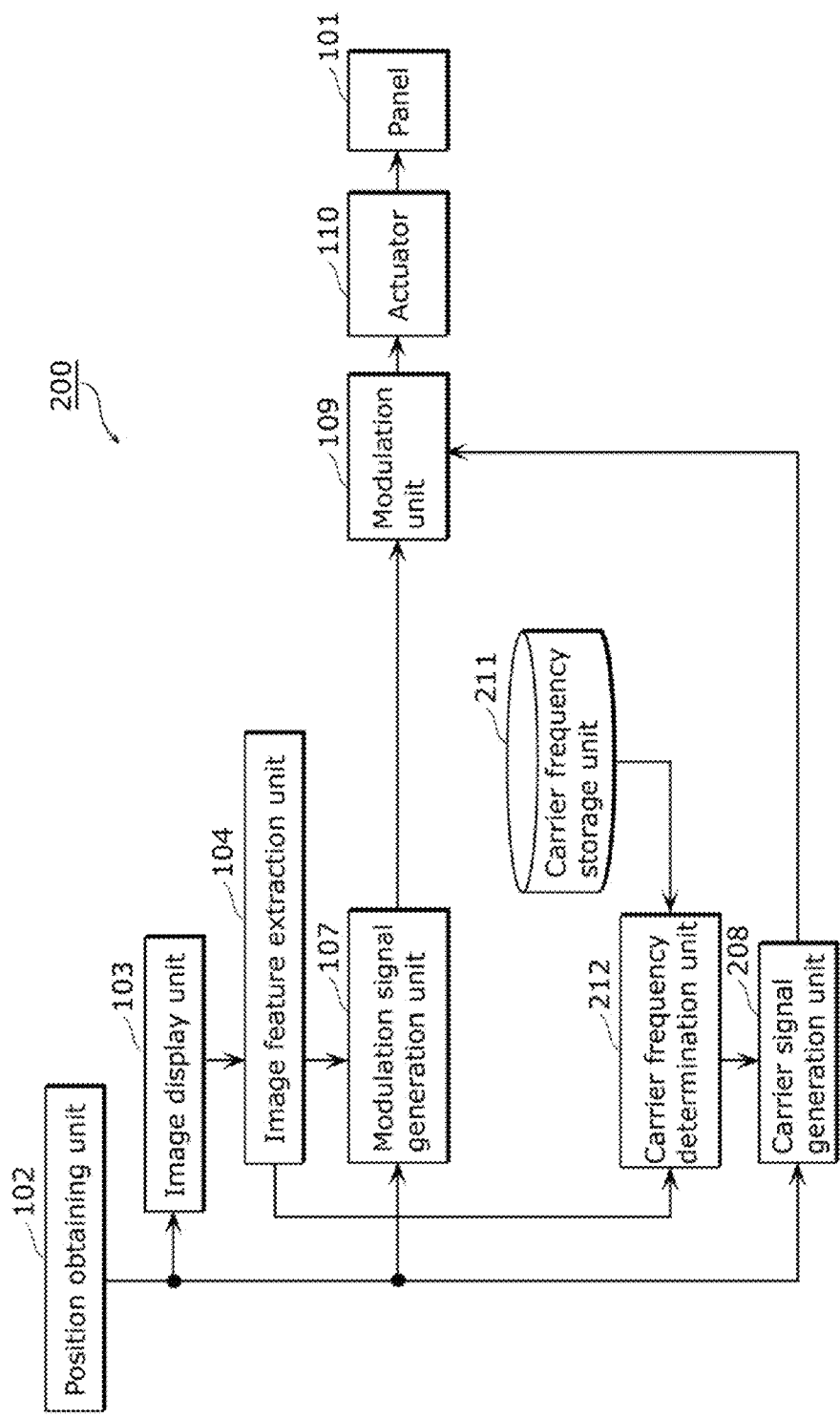
FIG. 10 is a block diagram of a haptic feedback device according to the second embodiment.

FIG. 10 is a block diagram of a haptic feedback device 200 according to the second embodiment. In FIG. 10, the structural elements that are the same as those in FIG. 1 share then same reference numerals, and as such, explanations thereof are omitted.

The haptic feedback device 200 includes the panel 101, the position obtaining unit 102, the image display unit 103, the image feature extraction unit 104, the modulation signal generation unit 107, a carrier signal generation unit 208, the modulation unit 109, the actuator 110, a carrier frequency storage unit 211, and a carrier frequency determination unit 212.

(Carrier Frequency Storage Unit 211)

The carrier frequency storage unit 211 stores a carrier signal frequency for each image feature.

(Carrier Frequency Determination Unit 212)

The carrier frequency determination unit 212 obtains, from the carrier frequency storage unit 211, a frequency corresponding to the feature of the image extracted by the image feature extraction unit 104.

First, processes performed when the image feature amount A extracted by the image feature extraction unit 104 is uniform will be described.

When the image displayed by the image display unit 103 has a uniform stripe pattern like the one shown in FIG. 3 for example, the image feature amount $\lambda$ has one value. For example, in the case of FIG. 3, the image feature amount $\lambda$ has a value of 0.5 (stripes/mm).

The carrier frequency determination unit 212 determines a higher frequency for the carrier signal for higher values of the image feature amount $\lambda$. Conversely, the carrier frequency determination unit 212 determines a lower frequency for the carrier signal for lower values of the image feature amount $\lambda$. In other words, the frequency of the carrier signal is represented as a function of image feature amount $\lambda$, as Equation 9 shows.

Figure 11:
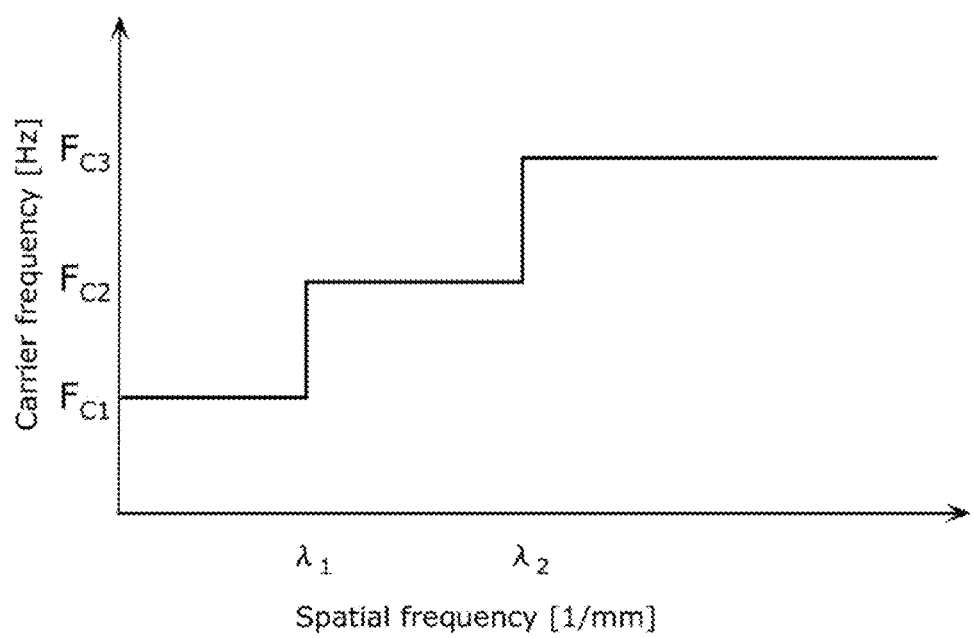
FIG. 11 is a graph showing the corresponding relationship between the spatial frequency and the carrier frequency according to the second embodiment.

The determination method of the frequency for the carrier signal is not limited to any particular method. For example, when the panel 101 has vibration characteristics like those shown in FIG. 8 and the image feature amount $\lambda$ is the spatial frequency, the carrier frequency determination unit 212 determines a frequency for the carrier signal like FIG. 11 shows. More specifically, the carrier frequency determination unit 212 determines a frequency of $F_{c1}$ for the carrier signal when $0 \leq \lambda < \lambda_1$. Moreover, the carrier frequency determination unit 212 determines a frequency of $F_{c2}$ for the carrier signal when $\lambda_1 \leq \lambda < \lambda_2$. Moreover, the carrier frequency determination unit 212 determines a frequency of $F_{c3}$ for the carrier signal when $\lambda_2 \leq \lambda$.

In other words, the carrier frequency determination unit 212 determines a higher frequency for the carrier signal for higher values of the spatial frequency. More specifically, the determination of the frequency for the carrier signal by the carrier frequency determination unit 212 is made such that the frequency of the carrier signal increases in a step-like manner when the spatial frequency increases. It should be noted that the threshold values $\lambda_1$ and $\lambda_2$ for the spatial frequency may be appropriately adjusted based on experience or tests. It should be noted that the determination of the frequency for the carrier signal by the carrier frequency determination unit 212 may be made such that the frequency of the carrier signal increases proportionally or exponentially when the spatial frequency increases.

[Math 9]

$$F_c = F_c(\lambda) \tag{9}$$

Incidentally, the panel 101 does not vibrate uniformly across all frequencies. The vibration characteristics of the panel 101 depend on various characteristics (size, thickness, hardness, etc.) of the panel 101. For example, as FIG. 8 shows, the panel 101 vibrates strongly at: a certain frequency (resonance frequency) due to resonance. Using a resonance frequency as the frequency of the carrier signal makes it possible to effectively vibrate the panel 101.

As such, the carrier frequency determination unit 212, for example, determines the frequency for the carrier signal to be a resonance frequency of the panel 101. At this time, the higher the spatial frequency $\lambda$ is, the higher the resonance frequency from among the plurality of resonance frequencies of the panel 101 the carrier frequency determination unit 212 determines for the frequency for the carrier signal.

Figure 4B:
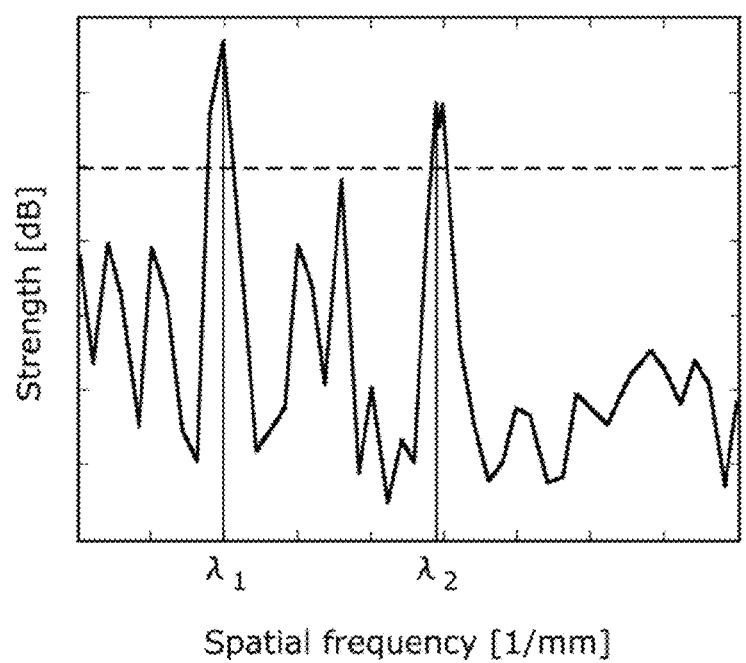
FIG. 4B is an example of a spatial frequency characteristic of an image displayed on the panel.

Next, the processes performed when the image feature amount $\lambda$ extracted by the image feature extraction unit 104 is not uniform will be described. For example, when an image having multiple image feature amounts, like the one shown in FIG. 4A, is displayed, the carrier frequency determination unit 212 determines a frequency for the carrier signal based on a spatial frequency characteristic of the image like is shown in FIG. 4B. More specifically, the carrier frequency determination unit 212 determines a frequency for the carrier signal using the spatial frequency component having the greatest strength as the spatial frequency of the image.

Moreover, for example, the carrier frequency determination unit 212 may determine a frequency for the carrier signal using the spatial frequency component having a strength that is greater than or equal to a predetermined threshold. In this case, when there are a plurality of spatial frequency components having a strength that is greater than or equal to the predetermined threshold, the carrier frequency determination unit 212 may determine each frequency for the carrier signal using the plurality of the spatial frequency components.

(Carrier Signal Generation Unit 208)

The carrier signal generation unit 208 generates a carrier signal having a frequency determined by the carrier frequency determination unit 212. In other words, the carrier signal generation unit 208 generates the carrier signal having a frequency component at a frequency dependent on the feature of the image extracted by the image feature extraction unit 104. More specifically, the carrier signal generation unit 208, for example, generates the carrier signal having a frequency component at a higher frequency for higher image spatial frequencies. More specifically, the carrier signal generation unit 208, for example, generates the carrier signal having, from among the plurality of resonance frequencies of the panel 101, a frequency component at a higher resonance frequency for higher spatial frequencies.

Next, processes performed when a plurality of frequencies are determined by the carrier frequency determination unit 212 are described. In this case, the carrier signal generation unit 208 generates the carrier signal having a frequency component at a plurality of determined frequencies. In other words, the carrier signal generation unit 208 generates a carrier signal by overlaying each of the sine waves of the plurality of determined frequencies. More specifically, the carrier signal generation unit 208 generates the carrier signal by summing the sine waves of the plurality of frequencies, as Equation 10 shows.

[Math 10]

$$s_C(t) = \Sigma \sin(2\pi F_c(\lambda_i)t) \tag{10}$$

Figure 12:
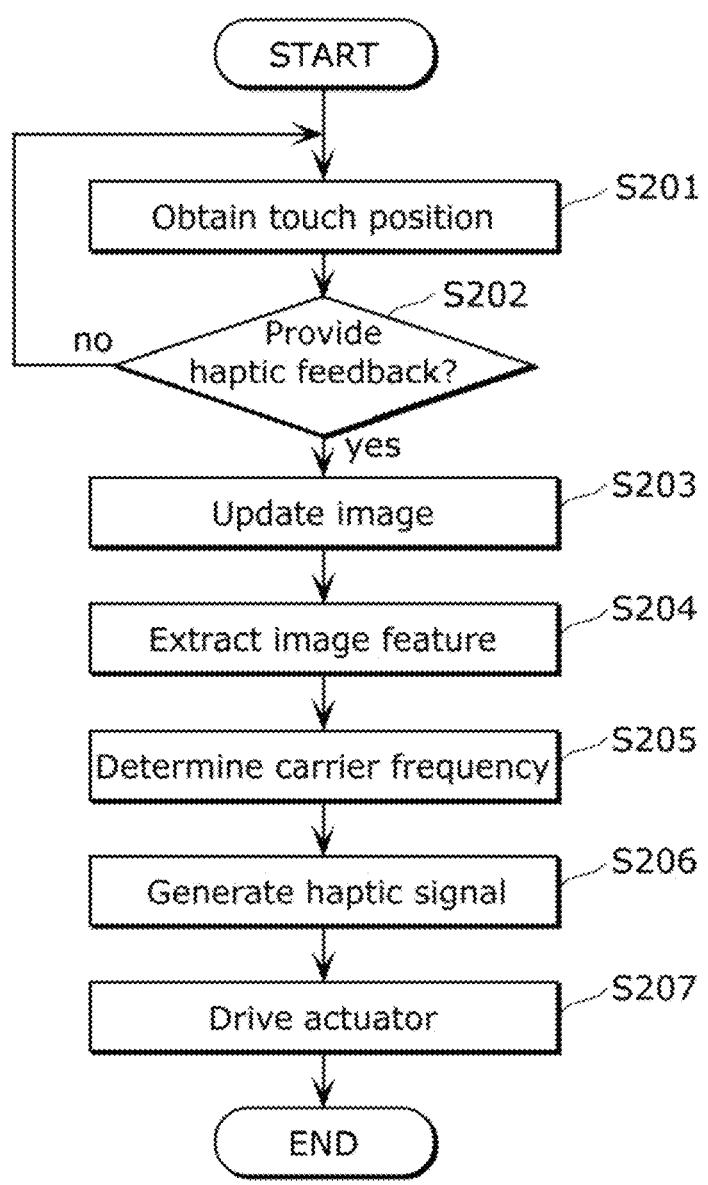
FIG. 12 is a flow chart of the processes performed by the haptic feedback device according to the second embodiment.

Next, operations performed by the haptic feedback device 200 having the above-described configuration will be described. FIG. 12 is a flow chart showing operations performed by the haptic feedback device 200 according to the second embodiment. It should be noted that detailed description of processes in FIG. 12 that are the same as in FIG. 9 are omitted.

(Step S201)

The position obtaining unit 102 obtains the touch position.

(Step S202)

The position obtaining unit 102 determines whether haptic feedback is necessary or not.

(Step S203)

The image display unit 103 updates the image being displayed as needed.

(Step S204)

The image feature extraction unit 104 extracts a feature of the image being displayed by the image display unit 103.

(Step S205)

The carrier frequency determination unit 212 determines a frequency for the carrier signal based on the feature of the image extracted by the image feature extraction unit 104. For example, the carrier frequency determination unit 212 determines a higher frequency for the carrier signal for higher spatial frequencies of the image.

(Step S206)

The haptic signal is generated based on the touch position obtained by the position obtaining unit 102 and the feature of the image extracted by the image feature extraction unit 104. More specifically, the modulation signal generation unit 107 generates a modulation signal having a frequency component at a frequency corresponding to the feature amount of the image. Moreover, the carrier signal generation unit 208 generates a carrier signal having a frequency determined by the carrier frequency determination unit 212. The modulation unit 109 then generates the haptic signal by performing amplitude modulation on the carrier signal using the modulation signal.

(Step S207)

The actuator 110 is driven using the haptic signal generated in step S206. In other words, the actuator 110 provides haptic feedback to the user by vibrating the panel 101 in accordance with the haptic signal.

As described above, with the haptic feedback device 200 according to the second embodiment, it is possible to provide haptic feedback based on the image displayed on the panel 101 by vibrating the panel 101. Furthermore, the haptic feedback device 200 is capable of changing the frequency of the carrier signal based on the feature of the image displayed on the panel 101. As such, the haptic feedback device 200 is capable of providing soft haptic feedback when the spatial frequency is low, and providing further detailed vibrations when the spatial frequency is high. In other words, the haptic feedback device 200 is capable of generating a carrier signal having a frequency component at a frequency dependent on a feature of the image, and capable of providing haptic feedback to the user touching the panel that is appropriate to the image being displayed on the panel.

Moreover, similar to the first embodiment, even when the image displayed on the panel 101 changes, the haptic feedback device 200 is capable of providing natural haptic feedback in coordination with visual perception of the user since changes in the image can be reflected in touch as needed.

Similar to the first embodiment it should be noted that the haptic feedback device 200 according to the second embodiment may further include the speed calculation unit 105 and the pressure measurement unit 106. In this case, similar to the first embodiment, the modulation signal generation unit 107 may, for example, generate a modulation signal having a frequency component at a higher frequency for higher touch speeds. Moreover, the modulation signal generation unit 107 may generate a modulation signal having a frequency component at a higher frequency for higher touch pressures.

Third Embodiment

Next, the third embodiment will be described. The third embodiment is different from the first embodiment in that the frequency of the carrier signal is changed based on the hardness of an object included in the image.

Figure 13:
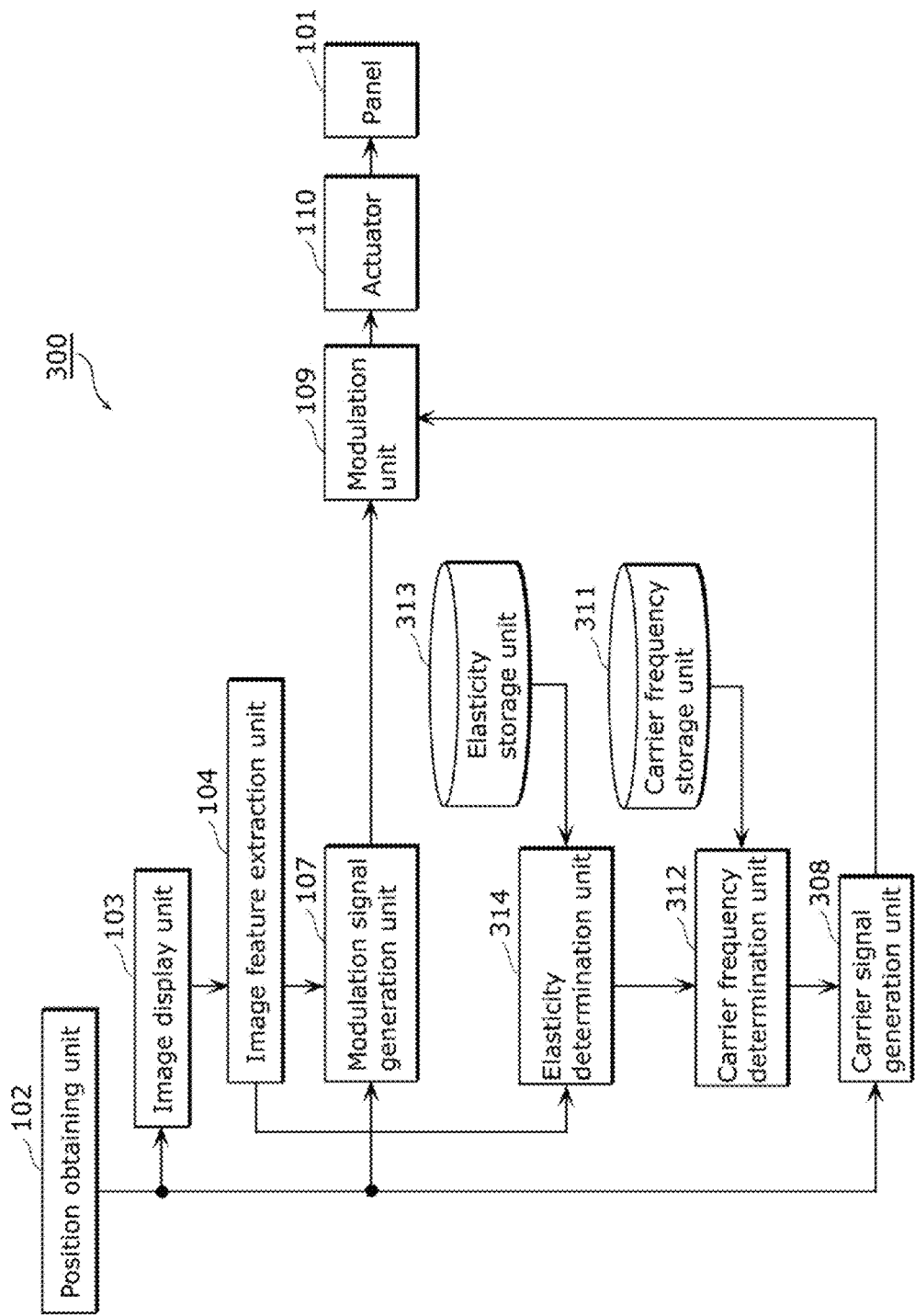
FIG. 13 is a block diagram of a haptic feedback device according to the third embodiment.

FIG. 13 is a block diagram of a haptic feedback device 300 according to the third embodiment. In FIG. 13, the structural elements that are the same as those in FIG. 1 share then same reference numerals, and as such, explanations thereof are omitted.

The haptic feedback device 300 includes the panel 101, the position obtaining unit 102, the image display unit 103, the image feature extraction unit 104, the modulation signal generation unit 107, the modulation unit 109, the actuator 110, an elasticity storage unit 313, an elasticity determination unit 314, a carrier frequency storage unit 311, a carrier frequency determination unit 312, and a carrier signal generation unit 308.

(Elasticity Storage Unit 313)

The elasticity storage unit 313 stores a degree of elasticity (Pa) for each feature of the image.

The degree of elasticity is one example of a value indicating the hardness of an object included in the image displayed on the panel 101. In other words, the degree of elasticity represents materialistic properties of an object included in the image displayed on the panel 101. In other words, even among texture images each of which has a uniform spatial frequency, there are images of hard materials like metal and images of soft materials like rubber. As such, the elasticity storage unit 313 stores a value indicating the hardness of a material corresponding to a feature of the image, for each feature of the image. In the third embodiment, degree of elasticity is used as a criterion for representing hardness of a material, but this example is not intended to be limiting. In other words, as long as the criterion can express hardness and/or softness of a material, any criterion may be used.

(Elasticity Determination Unit 314)

The elasticity determination unit 314 is an example of the hardness obtaining unit. The elasticity determination unit 314 determines a degree of elasticity based on the feature of the image extracted by the image feature extraction unit 104. In other words, the elasticity determination unit 314 obtains, from the elasticity storage unit 313, the degree of elasticity corresponding to the extracted feature of the image.

(Carrier Frequency Storage Unit 311)

The carrier frequency storage unit 311 stores a carrier signal frequency for each degree of elasticity. In other words, the carrier frequency storage unit 311 stores a plurality of frequencies each associated with one of a plurality of degrees of elasticity.

(Carrier Frequency Determination Unit 312)

The carrier frequency determination unit 312 determines a frequency for the carrier signal based on the degree of elasticity determined by the elasticity determination unit 314. More specifically, the carrier frequency determination unit 312 obtains, from the carrier frequency storage unit 311, a frequency corresponding to the determined degree of elasticity.

Figure 14:
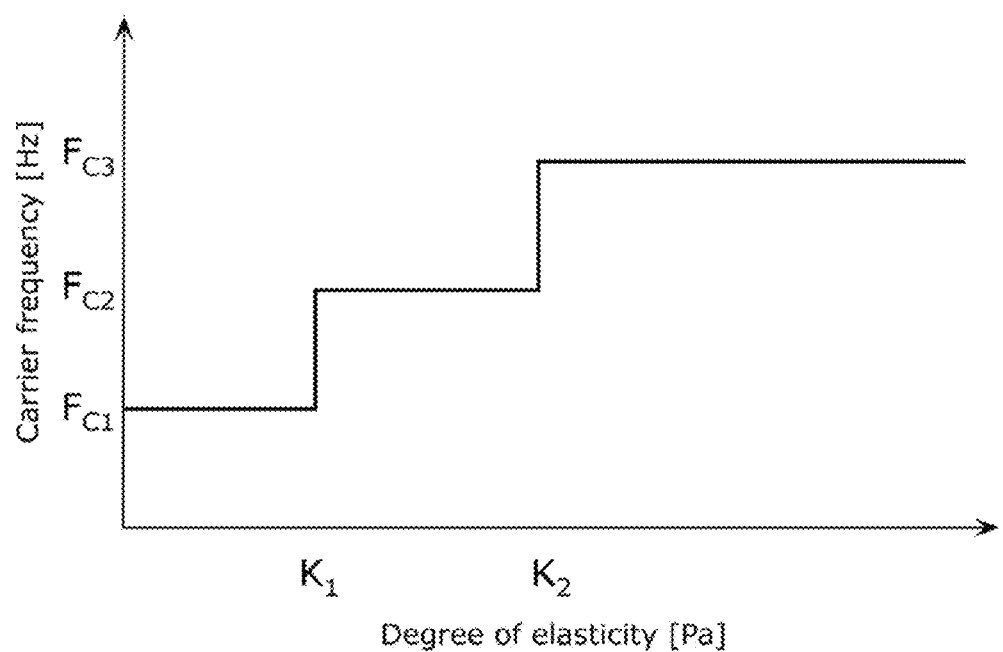
FIG. 14 is a graph showing the corresponding relationship between the degree of elasticity and the carrier frequency according to the third embodiment.

Even more specifically, the carrier frequency determination unit 312 determines the frequency for the carrier signal to be a higher frequency for higher degrees of elasticity K, as FIG. 14 shows. It should be noted that similar to the second embodiment, it is preferable that the frequency of the carrier signal is determined from the plurality of resonance frequencies of the panel 101.

(Carrier Signal Generation Unit 308)

The carrier signal generation unit 308 generates a carrier signal having a frequency determined by the carrier frequency determination unit 312. In other words, the carrier signal generation unit 308 generates the carrier signal having a frequency component at a frequency that increases with the value indicating the hardness of an object included in an image.

Figure 15:
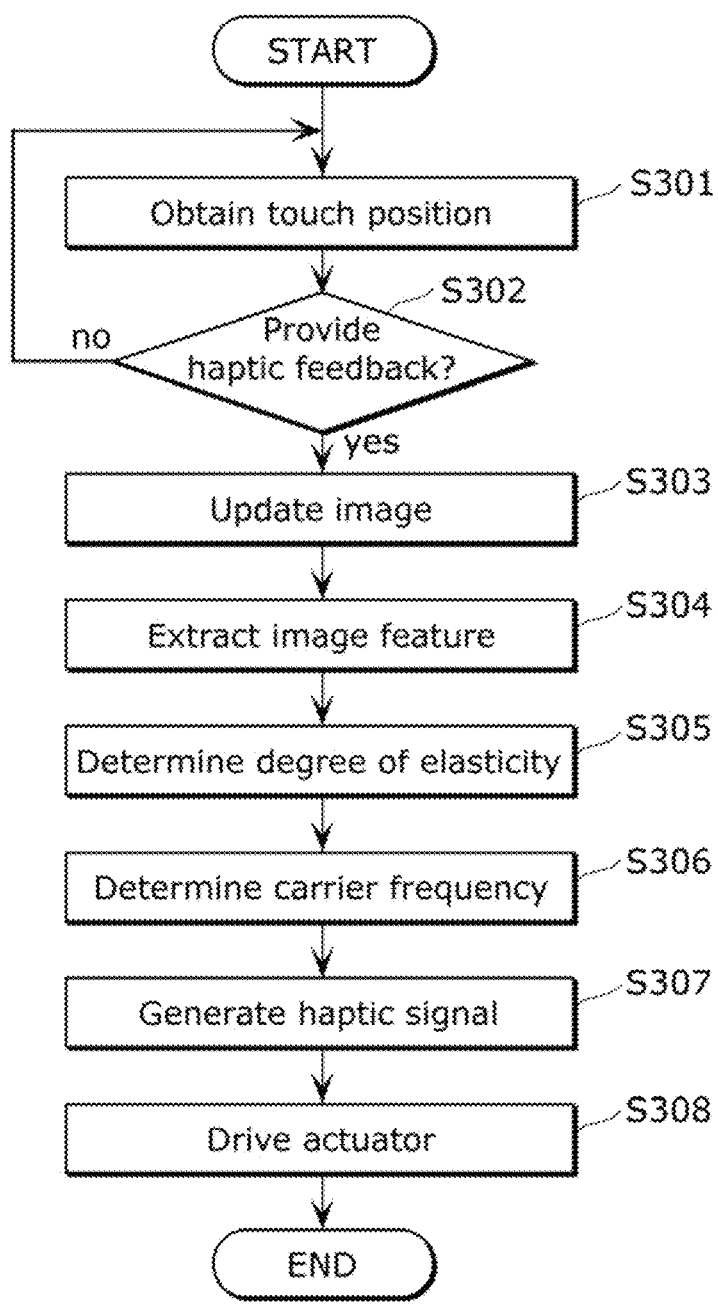
FIG. 15 is a flow chart of the processes performed by the haptic feedback device according to the third embodiment.

Next, specific examples of operations performed by the haptic feedback device 300 having the above-described configuration will be described. FIG. 15 is a flow chart showing operations performed by the haptic feedback device 300 according to the third embodiment. It should be noted that detailed description of processes in FIG. 15 that are the same as in FIG. 9 are omitted.

(Step S301)

The position obtaining unit 102 obtains the touch position.

(Step S302)

The position obtaining unit 102 determines whether haptic feedback is necessary or not.

(Step S303)

The image display unit 103 updates the image being displayed as needed.

(Step S304)

The image feature extraction unit 104 extracts a feature of the image being displayed by the image display unit 103.

(Step S305)

The elasticity determination unit 314 obtains a degree of elasticity from the elasticity storage unit 313 based on the feature of the image.

(Step S306)

The carrier frequency determination unit 312 determines a frequency for the carrier signal based on the degree of elasticity. More specifically, the carrier frequency determination unit 312 determines a frequency for the carrier signal such that the frequency of the carrier signal is higher for higher degrees of elasticity. Conversely, the carrier frequency determination unit 312 determines a frequency for the carrier signal such that the frequency of the carrier signal is lower for lower degrees of elasticity.

(Step S307)

The haptic signal is generated based on the feature of the image extracted by the image feature extraction unit 104, the touch position obtained by the position obtaining unit 102, and the carrier frequency determined by the carrier frequency determination unit 312. More specifically, the modulation signal generation unit 107 generates a modulation signal having a frequency component at a frequency corresponding to the feature amount of the image (the spatial frequency). Furthermore, the carrier signal generation unit 308 generates a carrier signal having a frequency determined by the carrier frequency determination unit 312. The modulation unit 109 then generates the haptic signal by performing amplitude modulation on the carrier signal using the modulation signal. (Step S308)

The actuator 110 is driven using the haptic signal generated in step S307. In other words, the actuator 110 provides haptic feedback to the user by vibrating the panel 101 in accordance with the haptic signal.

As described above, with the haptic feedback device 300 according to the third embodiment, it is possible to provide haptic feedback based on the image displayed on the panel 101 by vibrating the panel 101. Furthermore, the haptic feedback device 300 is capable of changing the frequency of the carrier signal based on the materialistic properties of an object included in the image displayed on the panel 101.

As such, the haptic feedback device 300 is capable of providing soft, smooth haptic feedback when the included object is soft, and providing further detailed vibrations when the included object is hard. In other words, the haptic feedback device 300 is capable of providing haptic feedback close to the haptic feedback felt when the user touches the actual object, and provide appropriate haptic feedback to the user touching the panel.

Moreover, similar to the first embodiment, even when the image displayed on the panel 101 changes, the haptic feedback device 300 is capable of providing natural haptic feedback in coordination with visual perception of the user since changes in the image can be reflected in touch as needed.

It should be noted that in the third embodiment, the value indicating the hardness of an object included in the image (degree of elasticity) is obtained from the feature of the image, but the method of obtaining the value indicating hardness is not limited to this example. For example, the elasticity determination unit 314 may receive an input of the value indicating hardness from the user. In this case, the value indicating hardness may be, for example, a value indicating a level of hardness (for example a value from one to five).

Similar to the first embodiment, the haptic feedback device 300 according to the third embodiment may further include the speed calculation unit 105 and the pressure measurement unit 106. In this case, similar to the first embodiment, the modulation signal generation unit 107 may, for example, generate a modulation signal having a frequency component at a higher frequency for higher touch speeds. Moreover, the modulation signal generation unit 107 may generate a modulation signal having a frequency component at a higher frequency for higher touch pressures.

Hereinbefore the haptic feedback device according to one or more aspect was described based on exemplary embodiments, but the present invention is not limited to these exemplary embodiments. Various modifications of the exemplary embodiments as well as embodiments resulting from combinations of constituent elements of the different exemplary embodiments that may be conceived by those skilled in the art are intended to be included within the scope of the one or more aspect as long as these do not depart from the essence of the present invention.

For example, the haptic feedback device is not absolutely required to include the structural elements shown in FIG. 1, FIG. 10, or FIG. 15. In other words, the haptic feedback device is not absolutely required to include some of the structural elements shown in FIG. 1, FIG. 10, or FIG. 15. For example, the haptic feedback device may be configured as FIG. 16 shows.

Figure 16:
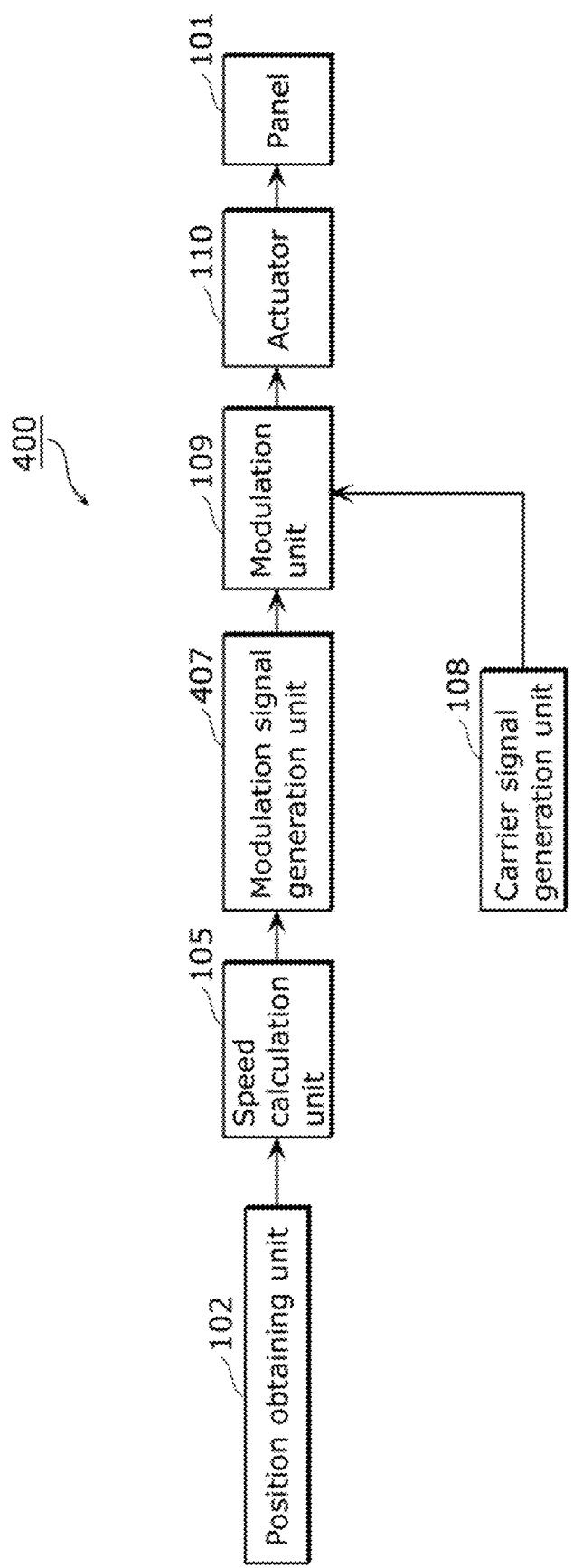
FIG. 16 is a block diagram of a haptic feedback device according to a variation.
Figure 17:
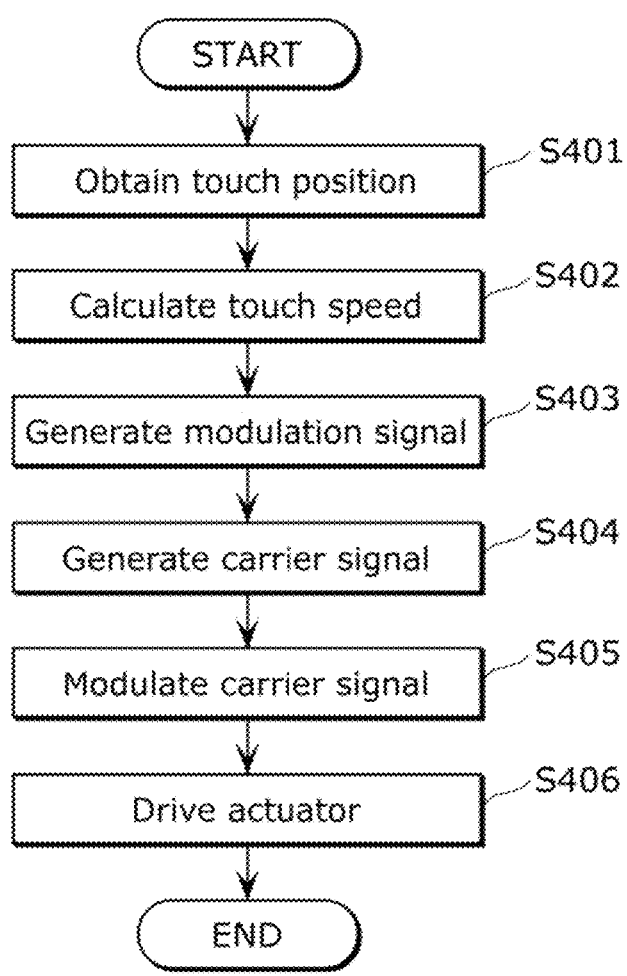
FIG. 17 is a flow chart of the processes performed by the haptic feedback device according to a variation.

FIG. 16 is a block diagram of a haptic feedback device 400 according to a variation. Moreover, FIG. 17 is a flow chart of the processes performed by the haptic feedback device 400 according to the variation. This haptic feedback device 400 does not use a feature of the image when providing haptic feedback to the user touching the panel 101.

As FIG. 16 shows, the haptic feedback device 400 includes the panel 101, the position obtaining unit 102, the speed calculation unit 105, a modulation signal generation unit 407, the carrier signal generation unit 108 the modulation unit 109, and the actuator 110.
(Step S401)

The position obtaining unit 102 obtains a touch position on the panel 101 at predetermined time intervals. In other words, the position obtaining unit 102 obtains a first touch position touched on the panel 101 by the user and a second touch position touch on the panel 101 by the user after the first touch position.
(Step S402)

The speed calculation unit 105 calculates the speed of a touch (touch speed) starting at the first touch position and ending at the second touch position.
(Step S403)

The modulation signal generation unit 407 generates a modulation signal having a frequency component at a higher frequency for higher touch speeds. More specifically, the modulation signal generation unit 407 generates, as the modulation signal $s_m$, a sine wave of a frequency proportional to the touch speed v by a proportional constant k (k>0) as Equation 11 shows, for example.

[Math 11]

$$s_m(t)=\sin(2\pi kv(t)t) \quad (11)$$

It should be noted that the frequency of the modulation signal is not required to be proportional to the touch speed. In other words, the frequency at the time of the second touch speed may simply be greater than the frequency at the time of the first touch speed (where the second touch speed is greater than the first touch speed).
(Step S404)

The carrier signal generation unit 108 generates a carrier signal for vibrating the panel 101. For example, the carrier signal generation unit 108 generates the carrier signal having a frequency component at a resonance frequency of the panel 101. It should be noted that the carrier signal generation unit 108 may generate the carrier signal having a frequency component at a frequency different than a resonance frequency of the panel 101. In other words, the carrier signal generation unit 108 may generate a carrier signal having a frequency component at a frequency haptically perceptible by the user.
(Step S405)

The modulation unit 109 generates the haptic signal by performing amplitude modulation on the carrier signal using the modulation signal. More specifically, the modulation unit 109 generates the haptic signal as Equation 7 or Equation 8 show.
(Step S406)

In other words, the actuator 110 provides haptic feedback to the user by vibrating the panel 101 in accordance with the modulated carrier signal (haptic signal).

With the haptic feedback device 400 according to this variation, it is possible to modulate the carrier signal using the modulation signal having a frequency component at a frequency that increases with the speed of the touch, and vibrate the panel in accordance with the modulated carrier signal. As such, the haptic feedback device 400 is capable of changing the amplitude of the vibration of the panel more rapidly as the speed of the touch increases, and capable of providing haptic feedback to the user touching the panel that is appropriate for the speed of the touch. This makes it possible for the user to easily confirm by touch that his or her touch has been correctly detected.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the haptic feedback device according to each of the embodiments is a program described below.

That is, the program causes the computer to execute a haptic feedback method of providing haptic feedback to a user touching a panel, the haptic feedback method including: obtaining a first touch position which is a position of a touch made on the panel by the user and a second touch position which is a position of a touch made on the panel by the user after the touch made at the first touch position; calculating a speed of a touch starting at the first touch position and ending at the second touch position; generating a modulation signal having a frequency component at a frequency that increases with the speed; generating a carrier signal for vibrating the panel; modulating the generated carrier signal using the modulation signal; and providing haptic feedback to the user by vibrating the panel in accordance with the modulated carrier signal.

The haptic feedback device according to one aspect of the present invention is capable of providing haptic feedback to a user touching a panel, and as such is applicable in devices having display panels, such as televisions, digital still cameras, digital movie cameras, personal computers, portable information devices, and cellular phones.

REFERENCE SIGNS LIST 100, 200, 300, 400 haptic feedback device
101 panel
102 position obtaining unit
103 image display unit
104 image feature extraction unit
105 speed calculation unit
106 pressure measurement unit
107, 407 modulation signal generation unit
108, 208, 308 carrier signal generation unit
109 modulation unit
110 actuator
110A first actuator
110B second actuator
211, 311 carrier frequency storage unit
212, 312 carrier frequency determination unit
313 elasticity storage unit
314 elasticity determination unit

The invention claimed is:

1. A haptic feedback device which provides haptic feedback to a user touching a panel, the haptic feedback device comprising:

the panel;
an image display unit configured to display an image on the panel;
an image feature extraction unit configured to extract a feature of the image displayed on the panel, the feature of the image extracted being the spatial frequency of the image;
a position obtaining unit configured to obtain a first touch position which is a position of a touch made on the panel by the user and a second touch position which is a position of a touch made on the panel by the user after the touch made at the first touch position;
a speed calculation unit configured to calculate a speed of a touch starting at the first touch position and ending at the second touch position;
a modulation signal generation unit configured to generate a modulation signal having a frequency component at a frequency that increases with the speed and is dependent on the feature of the image;
a carrier frequency determination unit configured to determine a resonance frequency to be used for a frequency for the carrier signal from among a plurality of resonance frequencies of the panel, the determined resonance frequency increasing as the spatial frequency increases such that the higher the spatial frequency the higher the resonance frequency;
a carrier signal generation unit configured to generate a carrier signal for vibrating the panel having a frequency component at the determined resonance frequency determined by the carrier frequency determination unit;
a modulation unit configured to modulate the generated carrier signal using the modulation signal; and
an actuator which provides haptic feedback to the user by vibrating the panel in accordance with the modulated carrier signal.

2. The haptic feedback device according to claim 1, wherein the image feature extraction unit is configured to extract, as the feature of the image, a spatial frequency of the image, and
the modulation signal generation unit is configured to generate the modulation signal having a frequency component at a frequency that increases with the speed and the spatial frequency.

3. The haptic feedback device according to claim 1, wherein the image feature extraction unit is configured to extract the feature of the image from a region that is a portion of the image and includes the second touch position.

4. The haptic feedback device according to claim 3, wherein the image feature extraction unit is configured to extract the feature of the image from the region having a size that increases with the speed.

5. The haptic feedback device according to claim 1, wherein the image feature extraction unit is configured to extract the feature of the image each time the image displayed on the panel is updated, and
the modulation signal generation unit is configured to generate the modulation signal each time the feature of the image is extracted.

6. The haptic feedback device according to claim 1, wherein the carrier signal generation unit is configured to generate the carrier signal having a frequency component at a resonance frequency of the panel.

7. The haptic feedback device according to claim 6, wherein the carrier signal generation unit is configured to generate the carrier signal having a frequency component at a resonance frequency among a plurality of resonance frequencies of the panel that corresponds to the second touch position.

8. The haptic feedback device according to claim 1, further comprising
a hardness obtaining unit configured to obtain a value indicating a hardness of an object included in the image,
wherein the carrier signal generation unit is configured to generate the carrier signal having a frequency component at a frequency that increases with the value indicating the hardness.

9. The haptic feedback device according to claim 1, further comprising
a pressure measurement unit configured to measure a pressure of the touch made at the second touch position,
wherein the modulation signal generation unit is configured to generate the modulation signal having a frequency component at a frequency that increases with the measured pressure.

10. A haptic feedback method of providing haptic feedback to a user touching a panel, the haptic feedback method comprising:
displaying an image on the panel;
extracting a feature of the image displayed on the panel, the feature of the image extracted being the spatial frequency of the image;
obtaining a first touch position which is a position of a touch made on the panel by the user and a second touch position which is a position of a touch made on the panel by the user after the touch made at the first touch position;
calculating a speed of a touch starting at the first touch position and ending at the second touch position;
generating a modulation signal having a frequency component at a frequency that increases with the speed and is dependent on the feature of the image;
determining a resonance frequency to be used for a frequency for the carrier signal from among a plurality of resonance frequencies of the panel, the determined resonance frequency increasing as the spatial frequency increases such that the higher the spatial frequency the higher the resonance frequency;
generating a carrier signal for vibrating the panel having a frequency component at the determined resonance frequency determined;
modulating the generated carrier signal using the modulation signal; and
providing haptic feedback to the user by vibrating the panel in accordance with the modulated carrier signal.

11. A non-transitory computer-readable recording medium having a computer program recorded thereon for causing a computer to execute the haptic feedback method according to claim 10.

* * * * *